United States Patent [19]
Mitchell et al.

[11] Patent Number: 6,126,722
[45] Date of Patent: Oct. 3, 2000

[54] ELECTROSTATIC REDUCTION SYSTEM FOR REDUCING AIRBORNE DUST AND MICROORGANISMS

[75] Inventors: Bailey W. Mitchell, Watkinsville; Henry D. Stone, Winterville, both of Ga.

[73] Assignee: The United States of America as represented by the Secretary of Agriculture, Washington, D.C.

[21] Appl. No.: 09/122,850

[22] Filed: Jul. 28, 1998

[51] Int. Cl.[7] ................................. B03C 3/019
[52] U.S. Cl. .................. 95/57; 95/64; 95/71; 96/53; 96/97; 361/226; 361/231
[58] Field of Search .................. 96/97, 96, 52, 96/53; 95/57, 64, 71; 361/226, 231–233, 235

[56] References Cited

U.S. PATENT DOCUMENTS

| | | | |
|---|---|---|---|
| 3,221,475 | 12/1965 | Wiemer | 96/97 X |
| 3,696,791 | 10/1972 | Saurenman et al. | 119/21 |
| 3,820,306 | 6/1974 | Vincent | 96/54 |
| 3,894,852 | 7/1975 | Von Berckheim | 96/85 |
| 3,923,006 | 12/1975 | Dugan et al. | 119/37 |
| 3,958,962 | 5/1976 | Hayashi | 96/97 |
| 3,973,927 | 8/1976 | Furchner et al. | 95/3 |
| 4,326,454 | 4/1982 | Saurenman | 99/451 |
| 4,388,667 | 6/1983 | Saurenman | 361/216 |
| 4,390,923 | 6/1983 | Saurenman | 361/222 |
| 4,398,499 | 8/1983 | Blakely | 119/43 |
| 4,484,249 | 11/1984 | Saurenman | 361/216 |
| 4,493,289 | 1/1985 | Saurenman | 119/21 |
| 4,686,069 | 8/1987 | Hahne et al. | 261/92 |
| 4,734,105 | 3/1988 | Eliasson et al. | 96/97 X |
| 4,829,398 | 5/1989 | Wilson | 361/213 |
| 4,918,568 | 4/1990 | Stone et al. | 361/231 |
| 5,010,777 | 4/1991 | Yehl et al. | 73/864.81 |
| 5,043,840 | 8/1991 | Yehl et al. | 361/231 |
| 5,125,936 | 6/1992 | Johansson | 96/97 X |
| 5,141,529 | 8/1992 | Oakley et al. | 95/57 |
| 5,210,678 | 5/1993 | Lain et al. | 96/97 X |
| 5,254,155 | 10/1993 | Mensi | 96/97 X |
| 5,290,343 | 3/1994 | Morita et al. | 96/96 X |
| 5,296,019 | 3/1994 | Oakley et al. | 96/95 |
| 5,322,550 | 6/1994 | Park | 96/97 X |
| 5,456,741 | 10/1995 | Takahara et al. | 96/97 X |
| 5,622,543 | 4/1997 | Yang | 96/97 X |
| 5,695,549 | 12/1997 | Feldman et al. | 96/97 X |
| 5,814,135 | 9/1998 | Weinberg | 96/97 X |
| 5,820,660 | 10/1998 | Ko | 96/97 X |

OTHER PUBLICATIONS

Mitchell et al., *Avian Diseases*, vol. 38, pp. 725–732, 1994.

*Primary Examiner*—Richard L. Chiesa
*Attorney, Agent, or Firm*—M. Howard Silverstein; John D. Fado; Gail E. Poulos

[57] ABSTRACT

A dust reduction system for reducing airborne contaminants such as, for example, dust, smoke, microorganisms, etc., includes at least one ion generator made up of at least one ionizer bar and a ground plane which is parallel and proximate to at least one bar. The system can also include a dust collection device such as a tray containing an aqueous composition optionally containing a degreaser, and/or a metal sheet with a water rinse system, and/or the surfaces of a room-sized enclosed space. The system can be applied to any enclosed space where it is desired to obtain high efficiency reduction of airborne dust and microorganisms. The system is especially useful in poultry production and processing areas such as hatching cabinets, throwing rooms, and controlled environment poultry rearing rooms.

26 Claims, 26 Drawing Sheets

ELECTROSTATIC REDUCTION SYSTEM FOR REDUCING AIRBORNE DUST AND MICROORGANISMS

BACKGROUND OF THE INVENTION

1. Field of the Invention

This invention relates to an electrostatic dust reduction system and a method for reducing dust, air contaminates, and airborne microorganisms in enclosed spaces, such as for example, poultry hatching cabinets, throwing rooms and controlled environment poultry rearing rooms, for example. The present invention reduces dust, microbial contamination and infection, especially of newly hatched chicks and poultry, including contamination and infection with human enteropathogenic organisms.

2. Description of the Related Art

The consumption of improperly prepared poultry products has resulted in numerous cases of human intestinal diseases. It has long been recognized that Salmonella spp. are causative agents of such diseases, and more recently Camplylobacter spp. As many as two million cases of salmonellosis occur annually in the United States (Stavrix et al., Journal of Food Protection, Volume 56, No. 2, 173–180, February, 1993); twice as many cases of campylobacteriosis are thought to occur (Krienberg et al., Food Technology, pages 77,80,81, and 98, July 1987). Both microorganisms may colonize poultry gastrointestinal tracts without any deleterious effects on the birds, and although some colonized birds can be detected, asymptomatic carriers can freely spread the microorganisms during production and processing, resulting in further contamination of both live birds and carcasses. Poultry serve as the primary reservoir for Salmonella and Campylobacter in the food supply (Jones et al., Journal of Food Protection, Volume 54, No. 4, 259–262, April 1991; Jones et al., Journal of Food Protection, Volume 54, No. 7, 502–507, July 1991). The intestinal contents of chickens may harbor up to $10^7$ Campylobacter and/or Salmonella per gram, and cross contamination during processing is frequent (Oosterom et al., Journal of Food Protection, Volume 46, No. 4, 339–344, April 1983). Studies have demonstrated that fecal material constitutes the major source from which edible parts of chickens are contaminated in processing plants. Therefore, to significantly reduce the level of contamination on processed poultry, pathogen-free birds must be delivered to the processing plant (Bailey, Poultry Science, Volume 72, 1169–1173, 1993).

Better control measures are needed to minimize the spread of these and other human enteropathogenic bacteria; and the most promising approach to achieve this end has been to decrease the incidence and level of colonization by these microorganisms in poultry gastrointestinal tracts. Hatching cabinets are known to be one of the primary sources for human enteropathogenic bacteria contamination of poultry. A considerable amount of dust is generated during the hatching process from the time of piping on day 20 through final hatching on day 21 of incubation. The dust is caused by the breaking up of egg shells and feather particles which are entrained into the air from the new chicks as they move around. Bailey et al (Poultry Science, Volume 71 (1):6; and Poultry Science, Volume 73(7), 1153–1157, 1994) demonstrated that a single salmonella contaminated egg could contaminate most of the eggs and newly hatched chicks in a hatching cabinet. This result suggests that extensive airborne transmission of the bacteria is possible since the typical hatching cabinet has several trays of fertile eggs on several different levels and on several different carts. Eggshell fragments, belting materials, and paper pads used in commercial hatcheries have also been shown to be sources of salmonella contamination (Cox et al, Poultry Sciences, Volume 69, 1606–1609, 1990).

Various intervention approaches have been taken in attempts to reduce airborne transmission of disease. Bailey et al (Poultry Science, Volume 75(2), 191–196, 1995) have demonstrated that chemical treatment of hatching cabinet air between day 18 and hatch can significantly reduce disease transmission caused by eggs which are internally contaminated with Salmonella. Treatments included UV-light, ozone, and fogging with hydrogen peroxide. The hydrogen peroxide treatment was the most effective in reducing salmonella on the shells, in the air, and in the chicks. Hopkins and Drury (Avian Diseases, Volume 15, 596–603, 1971) have demonstrated the ability of airborne diseases such as Newcastle disease virus (NDV) to be transmitted from groups of donor chickens to groups of susceptible chickens and the ability of high efficiency filters to interrupt this transmission. Madelin and Wathes (British Poultry Sciences, Volume 30, 23–37, 1989) found that a raised floor for broilers reduced respirable dust by a factor of 2 compared to dust in a room with broilers on deep liter. The airborne bacterial cfu counts were reduced by a factor of 3000 by the raised floors. Carpenter et al (British Poultry Sciences, Volume 27, 471–480, 1986) found that a recirculating high efficiency filter in a broiler house room reduced dust levels to about half that of an untreated room, and it reduced the concentration of airborne bacteria more than 100 fold.

Hugh-Jones et al (J. Hyg., Camb., Volume 71, 325–339, 1973) reported 63% of the NDV and 83–94% of total bacteria in poultry houses was found on particles >6 microns. Thirty-six percent of the NDV was on 3–6 micron particles. Estola et al (Journal of Hygiene, Volume 83, 59–67, 1979) reported complete protection from airborne transmission of Newcastle disease virus by negative air ionizers but later studies (Mitchell and King, Avian Diseases, Volume 38, 725–732, 1994) have not been able to confirm their results. The studies of Mitchell and King (1994, supra), in controlled environment transmission cabinets, resulted in reductions in airborne transmission of NDV of up to 28% using negative air ionizers, but they hypothesized that higher reductions were possible with more efficient ion generators and ion distribution systems. Since previous reports indicate that most airborne bacteria and viruses are attached to larger particles, it is useful to look at dust reduction studies which did not involve microorganisms.

Hoenig et al (Foundrymens Soc. Transactions, Volume 84, 55–64, 1976) used a charged spray to reduce silica sand dust from 20 mg/m$^3$ to 2 mg/m$^3$ with positively charged water fog. Mitchell (ASAE Paper 954592, Chicago, Ill., 1995) reported improvements in decay rates of up to 42 fold for total inhalable particles using a negative air ionizer. Ionizers have been used to achieve dust reductions of up to 67% (Bundy and Veenhuizen, Proc. CIGR, Latest Dev. in Livestock Housing, Urbana, Ill., June 1987; Czarick and Van Wicken, ASAE Paper 85-4510, Winter MTG ASAE, Chicago, Ill., 1985) in animal housing. Repace et al. (Clinical Ecology, Volume 11 (2), 90–94, Winter 1983–1984) showed ionizers could accelerate the precipitation of smoke particles in an unventilated room by up to a factor of 18 or up to an equivalent ventilation rate of 6 air changes per hour.

Saurenman et al. (U.S. Pat. No. 3,696,791-Oct. 10, 1972) disclose the use of air ionization for reducing air-borne particulates and ammonia gas and odors in feeding enclosures of animals, especially poultry. Ions are dispersed into the feeding areas. The device includes a means to disperse ions suspended overhead, a static voltage sensor, a control device, a voltage generator, a blower, and a positively charged conductive grid.

Saurenman (U.S. Pat. Nos. 4,388,667['667]-Jun. 14, 1983; 4,390,923['923]-Jun. 28, 1983; and 4, 493,289['289]-Jan. 15, 1985) discloses devices for reducing air-borne particulates and ammonia gas and odors in feeding enclosures of animals, especially poultry, using air ionization. The '289 patent discloses a device with flexible cables containing an elongated and sidewardly penetratable metallic core to which voltage is applicable. The cable includes a protective sleeve of insulating material and needles having shanks penetrating through the sleeve and extending sidewardly adjacent the core to make electrical contact with the core so as to receive application of voltage in order to dispense ions into the atmosphere from tips exposed outwardly from the cable. The apparatus also includes a voltage generator and a control device. It is grounded so that negatively charged particles are attracted to deck surfaces. The '667 patent discloses an apparatus similar to the one disclosed in the '289 patent which applies positive voltage to one electrically conducive cable and negative voltage to a second electrically conducive cable in order to control static charge, eliminate arching, and control net ion flux in animal or poultry zones.

Saurenman (U.S. Pat. No. 4,326,454['454]-Apr. 27, 1982) discloses ion dispensers which are supported on an extended carrier that defines the electrostatically charged surfaces. An extended metallic surface, that can be grounded, may be associated with the carrier surface. This metallic surface may be defined by the wall of the chamber containing the dispenser.

While various systems have been developed for dust reduction, including reduction of airborne transmission of disease, there remains a need in the art for a more effective system for reducing dust levels which in turn reduces microbial contamination using negative air ionization with a ground plane for enhancement of ion generation. The system can also include a liquid dust collection system which does not lose efficiency with time, even when exposed to large concentrations of dust. The present invention is different from the related art systems.

SUMMARY OF THE INVENTION

It is therefore an object of the present invention to provide a dust reduction system 40 for reducing air borne contaminants in enclosed spaces, such as for example rooms, poultry hatching cabinets, etc., that includes at least one negative air ion generator 50 that has at least one ionizing needle 3 and a ground plane 4 perpendicular and proximate to the at least one needle 3.

Another object of the present invention is to provide a dust reduction system 40 for reducing air borne contaminants which has about 3–12 ionizing bars 11 each containing a plurality of ionizing needle electrodes 3 and a ground plane 4 parallel and proximate to said bars 11.

A further object of the present invention is to provide a dust reduction system 40 for reducing air borne contaminants that further includes a grounded dust collection system.

Another object of the present invention is to provide a dust reduction system 40 for reducing air borne contaminants that includes at least one negative air ion generator 50 including at least one ionizing electrode 3 and a ground plane 4 perpendicular and proximate to at least one electrode 3 to create an electrostatic field which reduces air borne contaminants without formation of an arc.

A further object of the present invention is to provide a dust reduction system 40 for reducing air borne contaminants that includes at least one negative air ion generator including at least one ionizing needle 3 and ground plane 4; wherein at least one needle 3 and ground plane 4 can be positioned perpendicular and at least close enough without creating arcing and up to as far apart while still producing an electrostatic field which produces charged particles capable of reducing air borne contaminants, a non-conductive frame for supporting the at least one ionizing needle 3 and ground plane 4, a dc power source for supplying a voltage which is capable of inducing the electrostatic field, especially one of at least about −15 kV dc, and at least one dust collection device.

A still further object of the present invention is to provide a method for reducing air borne contaminants in contained spaces that includes placing at least one negative air ion generator 50 in an area of a ventilated enclosed space where air moves in the space past generator 50, dispensing negative ions from the at least one ion generator 50, charging air borne particles with negative air ions, and collecting the charged particles with a grounded collection device.

Further objects and advantages of the invention will become apparent from the following description.

BRIEF DESCRIPTION OF THE DRAWINGS

FIG. 18 is a photograph showing smoke diffusion below a suspended generator 50 with generator 50 on.

DETAILED DESCRIPTION OF THE INVENTION

Dust reduction system 40 described herein, while exemplified for poultry production, can be used in any enclosed space where reduction of airborne particulates such as, for example, dust, smoke, microorganisms, etc., is desired. For example, significant reduction of the dust level in areas containing hatching and/or newly hatched poultry should significantly reduce airborne transmission of disease to the newly hatched chicks, since studies have shown that salmonella can be transmitted through the air, especially in hatching cabinets. For purposes of the present invention, the term poultry includes any species raised for human consumption, such as for example, chickens, turkeys, ducks, quail, emu, etc.

Figure 1:
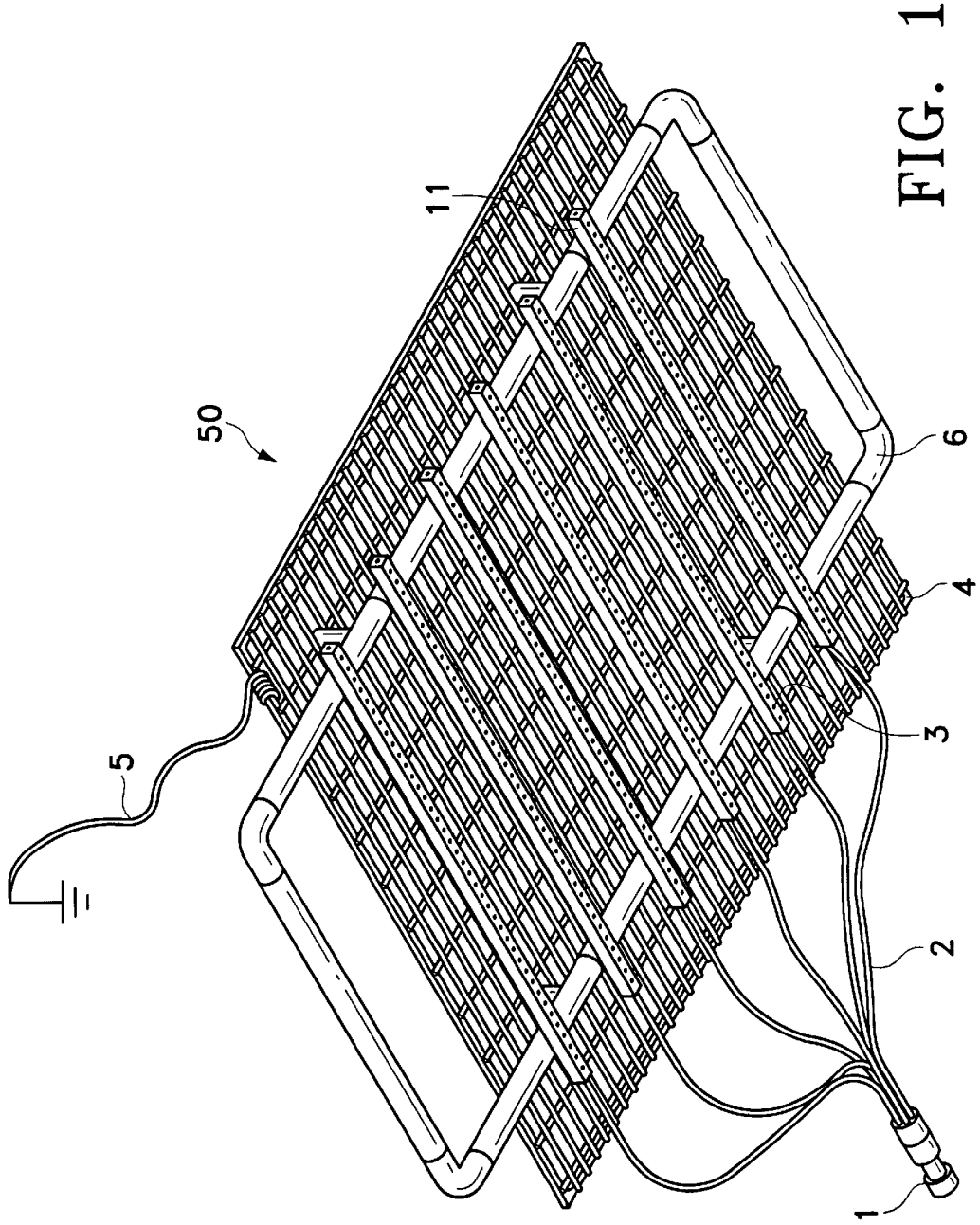
FIG. 1 illustrates negative air ion generator 50 showing ionizer bars 11, electrodes 3, ground plane 4, frame 6, ground wire 5, high voltage insulated wires 2, and electrical splice connector 1.

Dust reduction system 40 (FIGS. 2–4) includes at least one non-absorbent negative air ion generator 50 (FIG. 1). A strong space charge on dust particles is created in an enclosed space causing subsequent precipitation, attraction, and capture of these particles. These particles can be captured in a grounded dust collection device, such as for example elements 8 and 24 shown in FIGS. 2–4, as well as on most surfaces such as walls and floors, for example. The dust collection device 40 includes water and optionally a degreaser composition.

Negative air ion generator 50 is made up of a plurality of ionizer bars 11 with needle electrodes 3 (Inner Bar Assembly, Part Number 4101229, The Simco Company, 2257 North Penn Road, Hatfield, Pa. 19440-1998, for example) and ground plane 4 proximate to bars 11. Negative air ion generator 50 is operated at approximately −15,000 to approximately −30,000 volts dc, with approximately −30 kV dc preferred. However, any voltage producing space charges which cause reduction of airborne contaminants can be used. The number of bars 11 and length of each bar 11 per generator 50 is dependent on the desired space charge magnitude and the size of the enclosed space to be treated, determination of which is well within the ordinary skill in the art based on the present detailed description. It is preferred to use approximately 3–12 bars for most applications. For purposes of the present invention, an enclosed space is defined as any area surrounded by a material layer; such as for example a room or cabinet with four walls, floor, and ceiling. For example, generator 50 consisting of about six approximately 20" long bars 11 with electrodes spaced about every 0.5 inch on each bar 11 will treat a volume of about 3200 $ft^3$ with moderate to heavy dust loads (approximately 27 $ft^3$ of volume/ft of bar Each bar 11 has a high voltage insulated wire 2 which runs down the center of bar 11 and connects to the unexposed ends of the electrodes which are inserted into bar 11. Bars 11 are arranged so that insulated wire 2 for each bar 11 exits on the same side of each bar 11. All wires 2 are connected to an electrical splice connector 1 which in turn connects to an insulated wire from a high voltage negative dc power supply (not shown) typically located within approximately 10–30 feet of generator 50. For hatching cabinet applications, the wire to the power supply is routed through the wall of the cabinet to the power supply. For room size applications, the wire to the power is routed through a room wall to a power supply on the outside of the treated space.

Placement of a ground plane 4 in close proximity to bars 11 creates a strong electrostatic field which in turn charges particles in the vicinity of generator 50. Bars 11 can be positioned at least as close as possible to ground plane 4 without creating an arc to as far away from ground plane 4 as possible while still maintaining an electrostatic field strong enough to produce charged particles which reduce air borne contaminants. The closer ground plane 4 is to bars 11, the stronger the electrostatic field will be and the more effective the dust removal will be, however, the distance must be far enough apart to prevent arching. With a supply voltage of about −15 kV to −30 kV, they can be placed as close as about 3 inches away from plane 4. Ground plane 4 is any flat, electrically conductive material which can be connected to an electrical ground. It can be, for example, a solid plate, a grid made up of heavy welded wire, a section of expanded metal, etc. If a grid is used, any size grid is useable, the smaller the grid size the stronger the electrical field. Examples of materials that are useful include conductive metals such as for example aluminum, steel, brass, etc. A preferred embodiment is a grid ground plane 4 of heavy gauge bare wire with approximately 1×1 inch openings to allow for air circulation through plane 4. Air currents are used to distribute the negative air ions throughout the space to charge airborne dust. The charged particles can be circulated past a grounded dust collection device, such as for example elements 7 and 8 or 13,20,22 and 24 (FIGS. 2–4), which traps a large percentage of the particles. It is preferable that ground plane 4 have a slightly greater area than that of bars 11 layout. Attached to ground plane 4 at any edge is ground wire 5.

Bars 11 and ground plane 4 are attached to a non-conductive frame 6. Frame 6 can be of any configuration to support bars 11 and ground plane 4 without impeding the function of ion generator 50 while fitting into the space where it will be inserted. It can be constructed of any non-conductive material such as for example PVC, plastic, glass, ceramic, etc. Generally, a rectangular-shaped frame made of PVC piping which extends the length of ground plane 4 and is narrower than bars 11, is sufficient to support bars 11 and plane 4. For some uses where required, the frame can include support legs attached to the corners of the frame.

Figure 2:
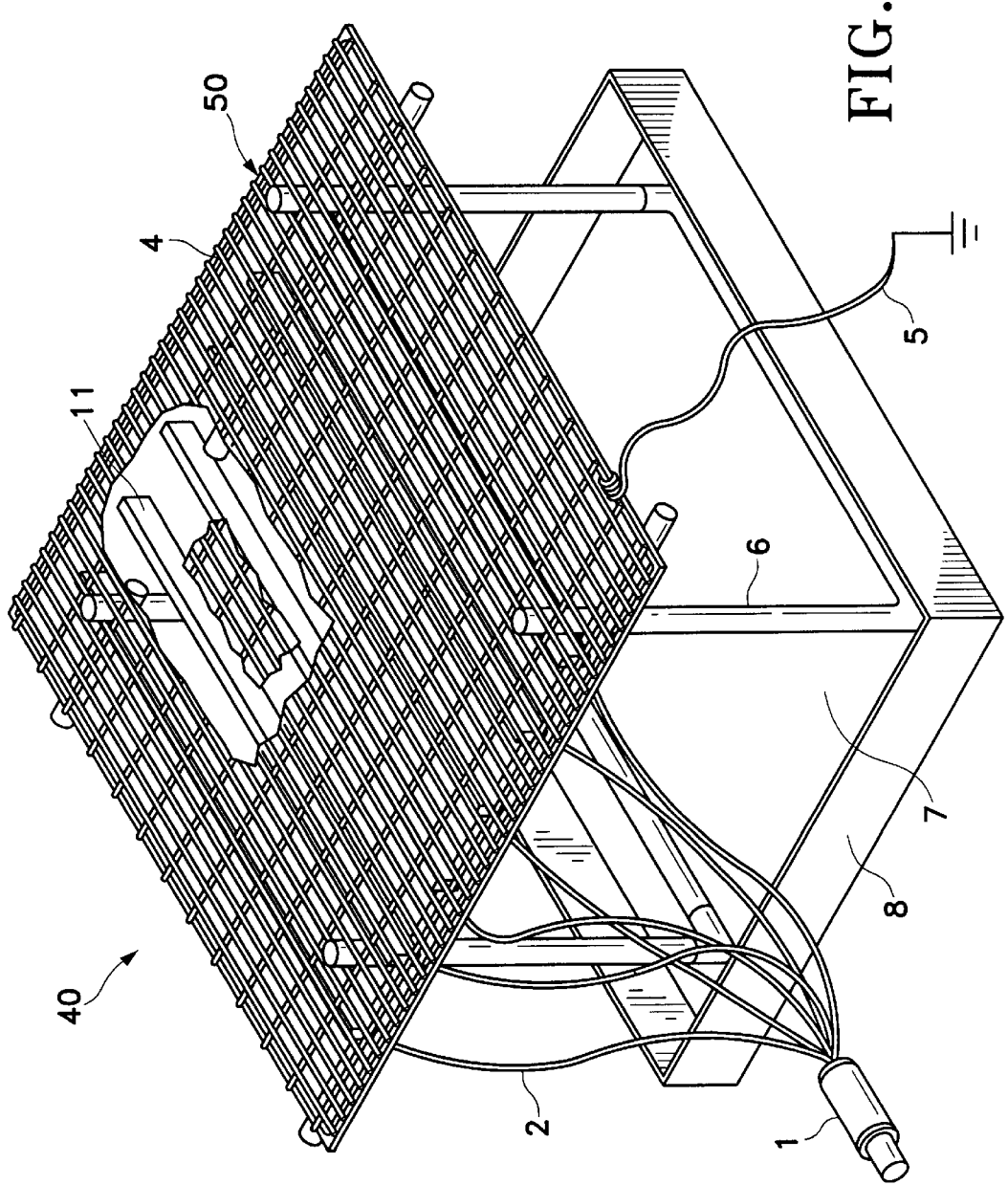
FIG. 2 illustrates system 40 including frame 6 with legs, dust collection device 8 with water and optional degreaser 7.
Figure 3:
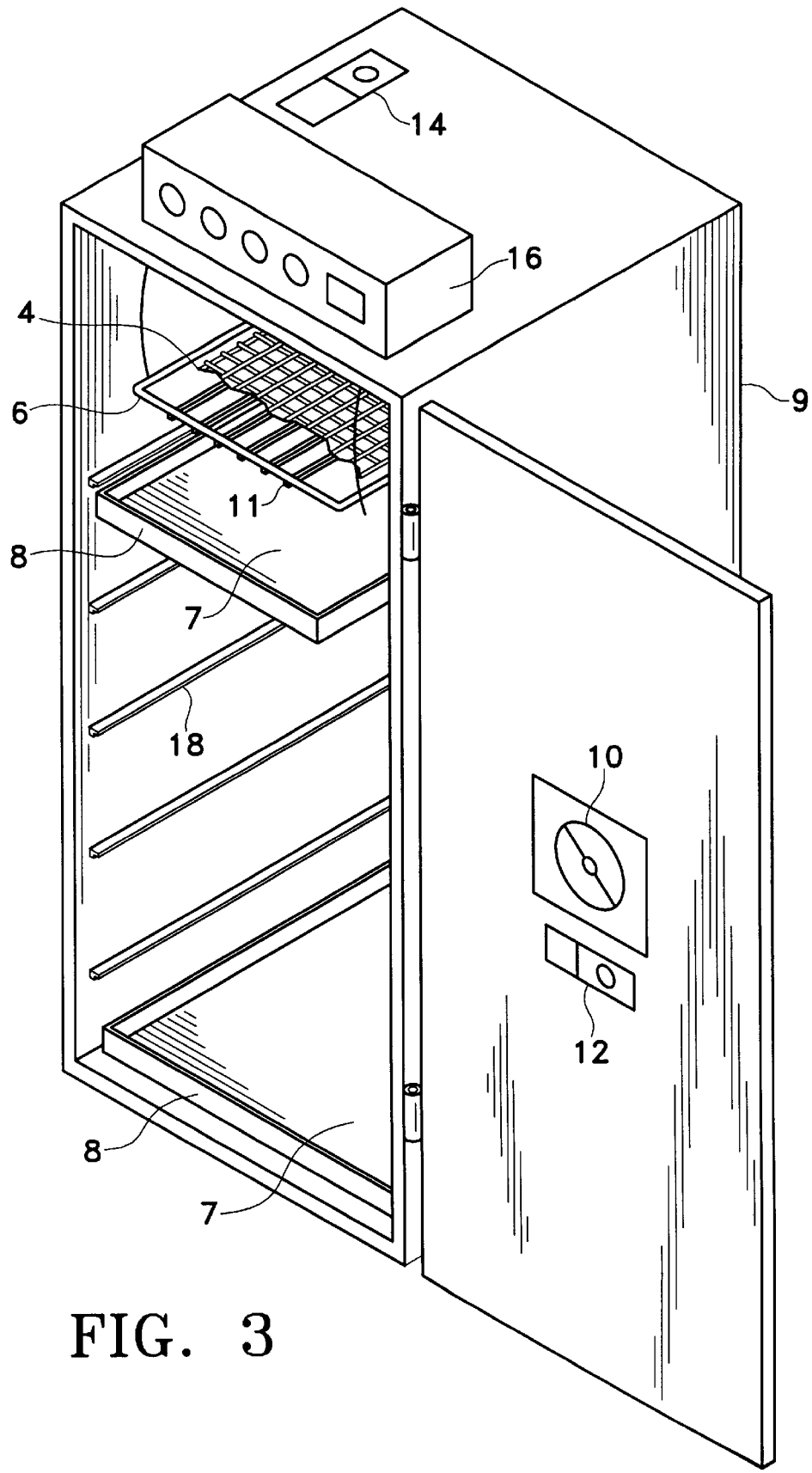
FIG. 3 illustrates hatching cabinet 9 including ventilation and recirculation fan 10, air inlet flow control damper 12, air outlet flow control damper 14, electrical controls 16, guide rails 18; and system 40 including bars 11, ground plane 4, frame 6 and dust collection device 8 with water and degreaser 7.
Figure 4A:
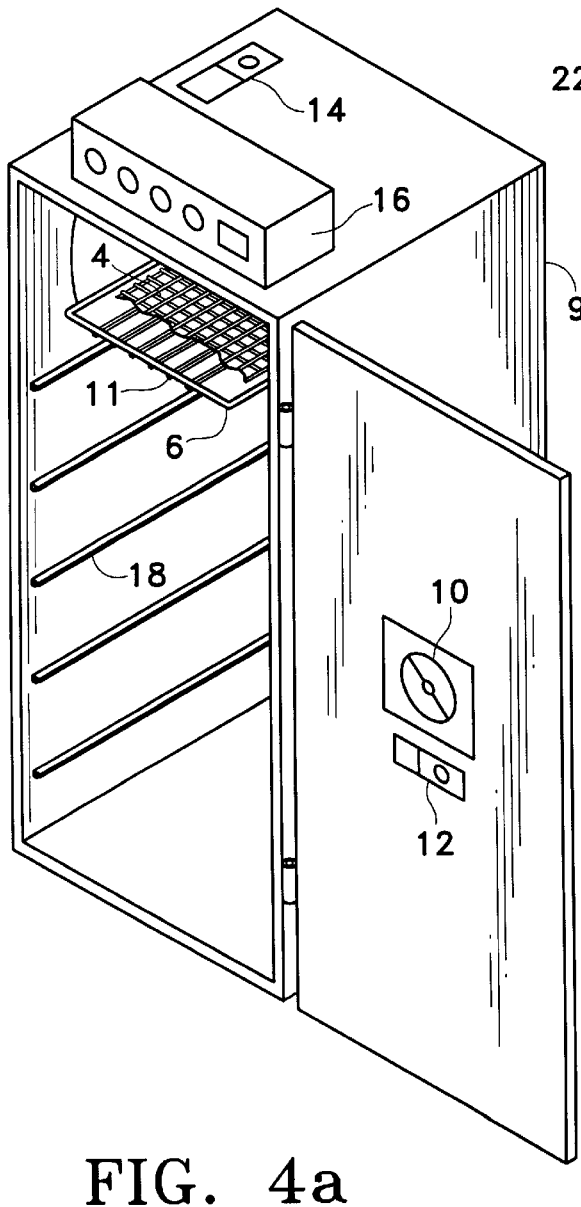
FIG. 4a illustrates hatching cabinet 9 including ventilation and recirculation fan 10, air inlet flow control damper 12, air outlet flow control damper 14, electrical controls 16, guide rails for hatching trays 18, ionizer bars 11, ground plane 4, and non-conductive frame 6.

Dust reduction system 40 may include a grounded dust collection device for some applications. On embodiment for use in small commercial hatching cabinets includes a grounded water tray 8 placed in the bottom of cabinet 9 (FIG. 3). A second upper tray 8 is located beneath bars 11 and ground plane 4 which are attached to frame 6. Typically, frame 6 with legs sits in upper tray 8 (FIG. 2). Trays 8 are filled to a depth of at least about one inch with water and a degreaser composition. The degreaser composition for the purposes of this invention is anything which helps wet the collected particles allowing them to settle to the bottom of the dust collection device, such as, for example, common liquid dishwashing detergents. The degreaser is in amounts effective to wet the particulates captured by the dust collection device so that the particulates settle to the bottom of the device instead of floating on top of the water surface. Typical degreaser concentration used in the liquid solutions is approximately about 2 to 3%. The amount of the water degreaser composition should be enough so that the composition does not evaporate completely before the hatching process is completed.

Figure 4B:
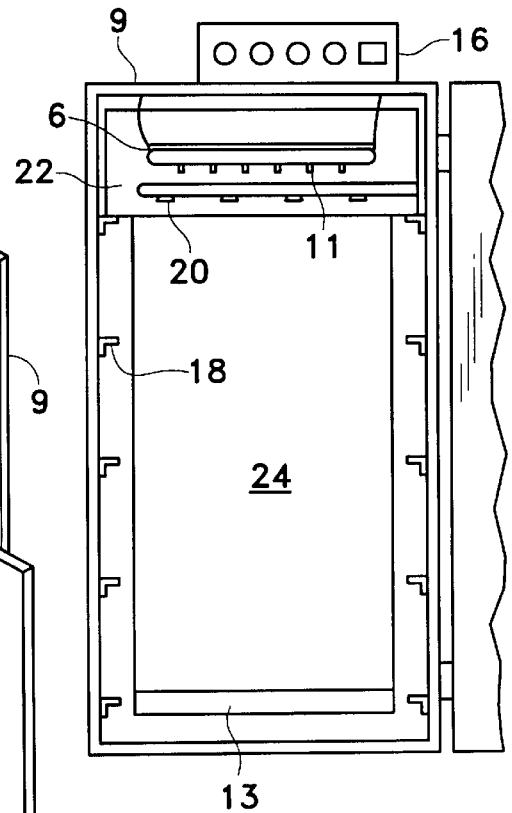
FIG. 4b illustrates hatching cabinet 9 including electrical controls 16, guide rails for hatching trays 18, water spray nozzles 20, metal splash guard 22, metal dust collector plate 24, trough and drain 13, ionizer bars 11, and frame 6.
Figure 25:
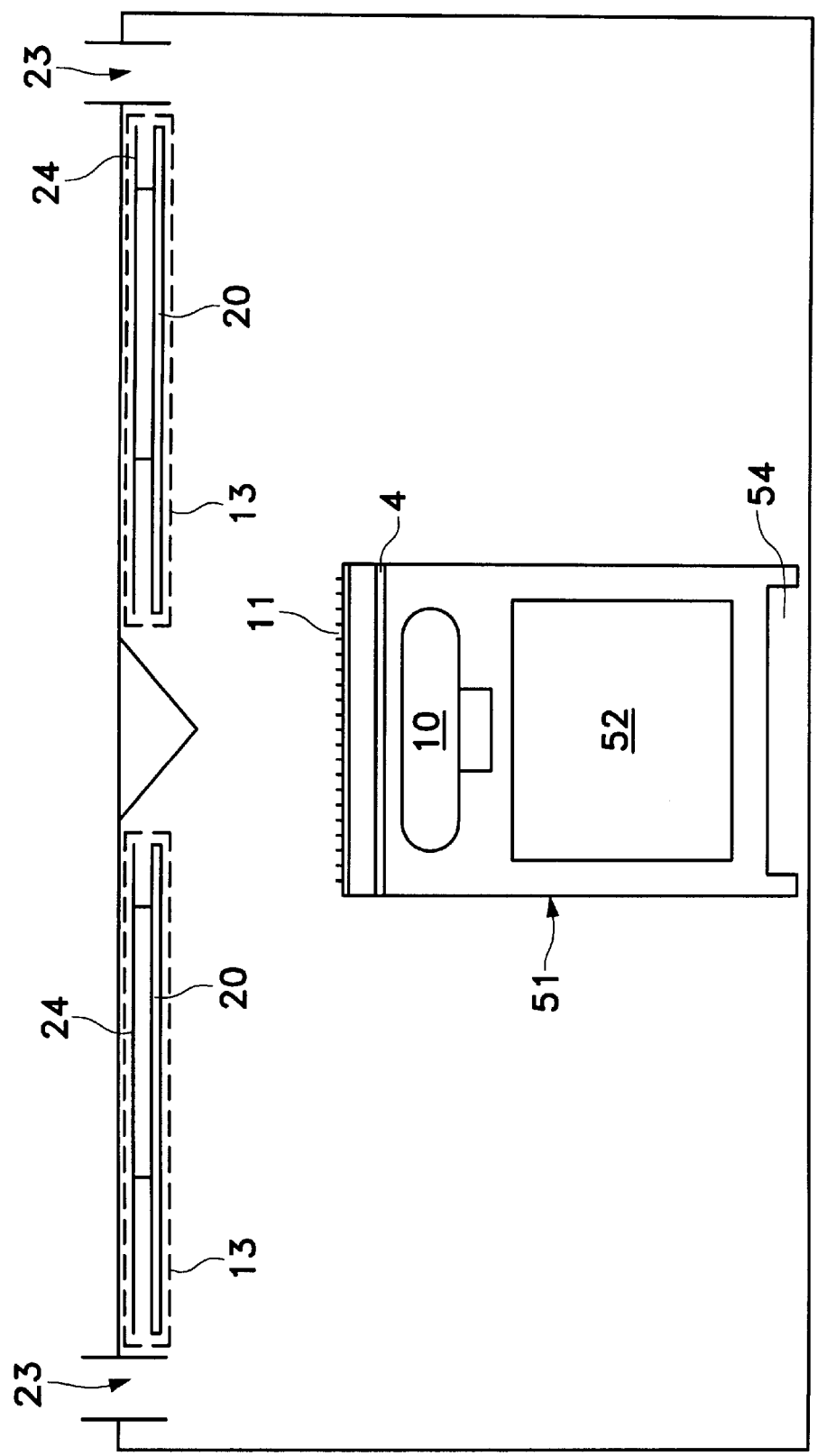
FIG. 25 illustrates two dust collection systems attached to back of a large commercial hatching cabinet showing nozzles 20, metal dust collector plate 24, trough and drain 13, hatching cabinet exhaust port 23, and one ion generator including ionizing bars 11 and ground plane 4 attached to air handling unit 51 that includes cooling coils 52, fan 10 and air inlet duct 54.

Another embodiment of grounded dust collection device, typically used in large commercial hatching cabinets, includes grounded metal dust collector plates 24 attached to the back wall of hatching cabinet 9 with water spray nozzles 20 which are mounted above or beside plate 24, and negative air ion generator 50 (FIG. 4b). Trough and drain 13 for plate 24 rinse water is located on the floor of cabinet 9. Plate 24 serves as a grounded metal dust collector and is made of any type of metal. It is preferable that the size of plate 24 is about one-fourth the total area of the four walls of cabinet 9. It is preferable to attach plate 24 flush to the rear of hatching cabinet 9 using any type of hanging means, such as for example hangers, screws, brackets, etc. Spray nozzles 20 are placed along the top of plate 24 or along the side of plate 24 approximately 8–10 inches apart. Generally, a plate of approximately 48 inches in width require at least about 5 nozzles. Alternatively, any means for applying water to rinse plate 24 can be used. For example, a pipe such as a PVC pipe, with holes drilled approximately every 2 inches can be attached to the top of a hatching cabinet so that water from the drilled holes will trickle down plate 24. The nozzles or pipe are operatively attached to a manifold and solenoid valve (not shown). The solenoid valve is controlled by the cabinet humidity control which causes water to be applied to collector plate 24 when cabinet humidity drops below a set point of typically about 55%. This raises the humidity to the set point and functions to moisten and rinse plate 24. In some applications, the solenoid valve is also operated by a time proportioning controller to assure that the plate is rinsed at least about every 30 minutes. Moisture on grounded plate 24 helps collect charged dust particles more effectively and each new rinse event helps rinse collected dust into trough and drain 13 (FIGS. 4b and 25). Depending on the air circulation in a hatching cabinet, spray nozzles or pipe can mounted along the side of plate 24 such that water is applied sideways rather than downward. Nozzles 20 or pipe with holes can be attached by any means. In the case of nozzles 20, the nozzles are at least about 3–6 inches from plate 24 allowing the spray angle of nozzles 20 to be adjustable towards the sheet.

For large ventilated enclosed spaces such as rooms, a controlled environment poultry rearing room 34 for example, ground plane 4 and the room surfaces serve as a dust collection device.

For small commercial hatching cabinets, one configuration for system 40 includes ionizer bars 11 proximate to ground plane 4 and at least two grounded dust collection devices containing water and a degreaser 7 (FIGS. 2 and 3). Ground plane 4 is made up of a heavy gauge wire grid with approximately 1×2 inch openings. Bars 11 and ground plane 4 are supported by frame 6. Frame 6 is generally rectangular in shape with legs 6 attached near the corners. Frame 6 with legs is placed into an upper grounded water tray of hatching cabinet 9 and serves as grounded dust collection device. Tray 8 slides into the cabinet using the top set of guide rails 18. Water and degreaser 7 are added to tray 8 to a depth of at least about 1 inch (FIG. 3). All rails and metal parts in the cabinet are grounded. Another tray 8 with water and degreaser 7 is placed on the floor of the cabinet. Hatching cabinet 9 includes ventilation and recirculation fan 10 and air inlet flow control damper 12 located on the door of cabinet 9. It also includes air outlet flow control damper 14 and electrical controls 16 for the hatching cabinet located externally on the top of cabinet 9. For larger commercial hatching cabinets the dust collection device described above that includes metal dust collector plate 24, a means for applying water to plate 24 and a trough and drain 13 is typically used.

Figure 5:
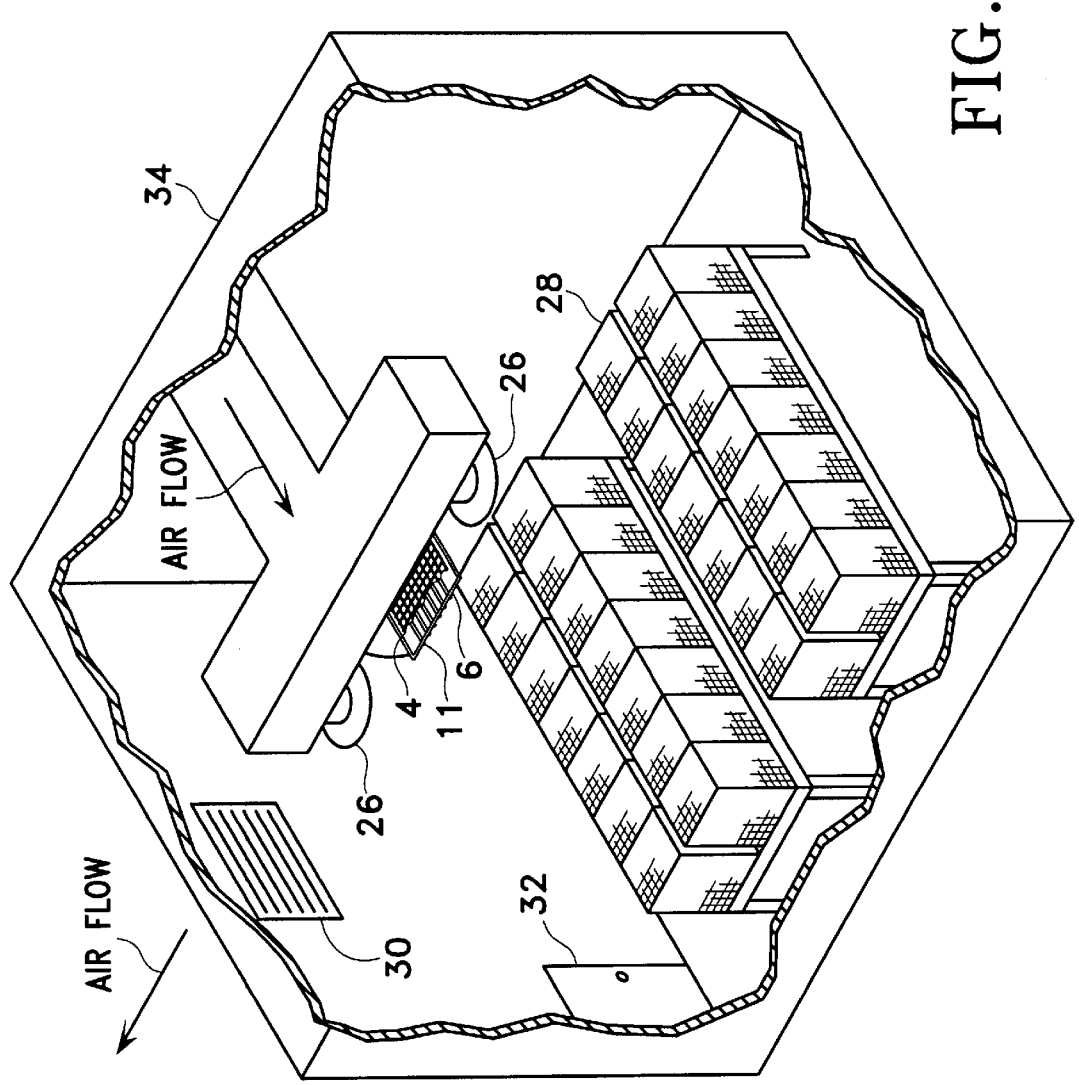
FIG. 5 illustrates controlled environment room 34 including room air outlet 26, cages 28, room exhaust register 30, room door 32; and ionization bars 11, ground plane 4, and frame 6.

For large ventilated enclosed spaces such as rooms, a controlled environment poultry rearing room 34 for example, negative air ion generator 50 is positioned near the ceiling of the room proximate to the room air distribution outlets 26 such that air from outlets 26 flows across the ionizer bars 11 and distributes charge throughout the room (FIG. 5). It is preferred that generator 50 is located near the center of the room and well away from exhaust outlet 30 to maximize the operation of generator 50. The farther the distance, the greater the opportunity for the treated air to charge airborne dust and precipitate it or cause it to adhere to surfaces in the room before it is exhausted. In this embodiment, generator 50 includes bars 11 with needle electrodes 3, ground plane 4 proximate to bars 11, and frame 6. Ground plane 4 and the room surfaces in this embodiment, serve as dust collection device.

In operation, generator 50 is placed in an upper area of an enclosed space and operated continuously at about −20,000 to −30,000 V dc to generate a negative electrostatic charge throughout the space. For small ventilated enclosed spaces such as hatching cabinets, for example, generator 50 is placed above the top hatching basket and fertile eggs are transferred into hatching cabinet 9 at about 18 days after incubation has been initiated. In the embodiment employing a dust collection device with trays 8, an aqueous composition containing a degreaser is added to tray 8 which is placed on the floor of the cabinet as a dust collection device. When frame 6 has legs, the frame can be set into another tray 8 containing an aqueous composition containing a degreaser and located in the top of the cabinet. This tray is the supported by the guide rails 18 located in the upper portion of cabinet 9. For embodiments employing a dust collection device that includes a metal dust collector plate 24 and a means for applying water to plate 24, a solenoid valve controlled by the cabinet humidity control or by a timer, causes water to be applied to plate 24 to rinse it. Generator 50 is operated continuously at about −20,000 to about −30,000 V dc to generate a negative electrostatic charge throughout the cabinet from transfer through hatching on day 21. System 40 is cleaned at the end of each hatching period.

For rooms, such as for example poultry rearing rooms, generator 50 is placed near the ceiling of the room near the air distribution outlets and is operated continuously as needed. When used in poultry rearing rooms, ground plane 4 and bars 11 need to be cleaned about every 2 to 3 days to maintain efficient operation due to accumulation of dust.

The following examples illustrate the use of the invention for reducing airborne particulates in poultry hatching cabinets and rooms. They are intended to further illustrate the invention and are not intended to limit the scope of the invention as defined by the claims. Multiple or expanded units, using the same principles can be used for reduction of airborne contaminants in larger ventilated spaces.

EXAMPLE 1

This example was conducted in a SurePip incubator which had an interior volume of 1.33 m$^3$, and a ventilation rate of approximately 0.13 m$^3$/min. The interior of the SurePip cabinet is constructed of fiberglass coated Styrofoam panels except for the floor, door frame, and humidifier drip tray which are aluminum. Two configurations of ion generator 50 were used:

1. A 3-bar configuration with approximately 35.6 cm long bars 11 constructed out of TEFLON with needle electrodes 3 spaced approximately every 1.23 cm and attached to a non-conducting PVC frame 6.
2. A 6-bar configuration with approximately 50.8 cm bars 11 constructed out of TEFLON with needle electrodes 3 spaced approximately 1.25 cm and attached to a non-conducting PVC frame.

Generator 50 configurations were positioned such that the tips of electrodes 3 were about 8.9 cm below ground plane 4 with electrodes 3 facing downward. The aluminum drip tray at the top of cabinet 9 served as ground plane 4 for the 3 bar configuration and a heavy gauge welded steel wire grid with about 2.5×5 cm openings served as ground plane 4 for the 6 bar configuration. Generator 50 was operated at about −20 kV dc.

Particle counts were made with a Climet CI-500 laser particle counter (Climet Instruments, Inc., 1320 W. Colton Ave., Redlands, Calif. 92374) in six ranges: about 0.3–0.5, about 0.5–1.0, about 1.0–5.0, about 10.0–25.0 and about >25 microns; at a sampling rate of about 2.8 L/min (0.1 ft$^3$/min).

Since ambient dust counts in the inhalable range are typically quite high (See Generator off Interval on FIGS. 6–8) and consistent over a period of several hours, the initial testing of generator 50 efficiency was conducted using ambient air.

The following procedure for 2 reps was as follows:
1st interval (≈30 min): Begin measurements for about 30 min with the incubator door open and the generator 50 off to allow for complete infiltration of ambient air.
2nd interval (≈60 min): Close hatcher door, turn hatcher fan 10 on, and turn generator 50 on.
3rd interval (≈60 min): Turn hatcher fan off (generator 50 still on, door shut)
4th interval (≈30 min): Everything off, stop measurements at end of this interval.

Hatcher 9 was operated at ambient temperature and humidity to determine the effect of negative air ion generator 50 alone for reducing dust levels. During normal operation, hatcher 9 operates at 37.8° C. and 55% relative humidity (RH) with humidity controlled by a misting nozzle 20 which would add to the particle count even though it would probably reduce the actual dust level. A 51 cm W×82 cm L×4 cm H sheet metal tray, normally used to catch excess water generated during humidification, was used as dust collection device in the bottom of the hatcher and was filled with about 2 cm of water and connected to an earth ground to provide a sink for the negatively charged dust particles as they were recirculated by the hatcher fan 10.

Figure 6:
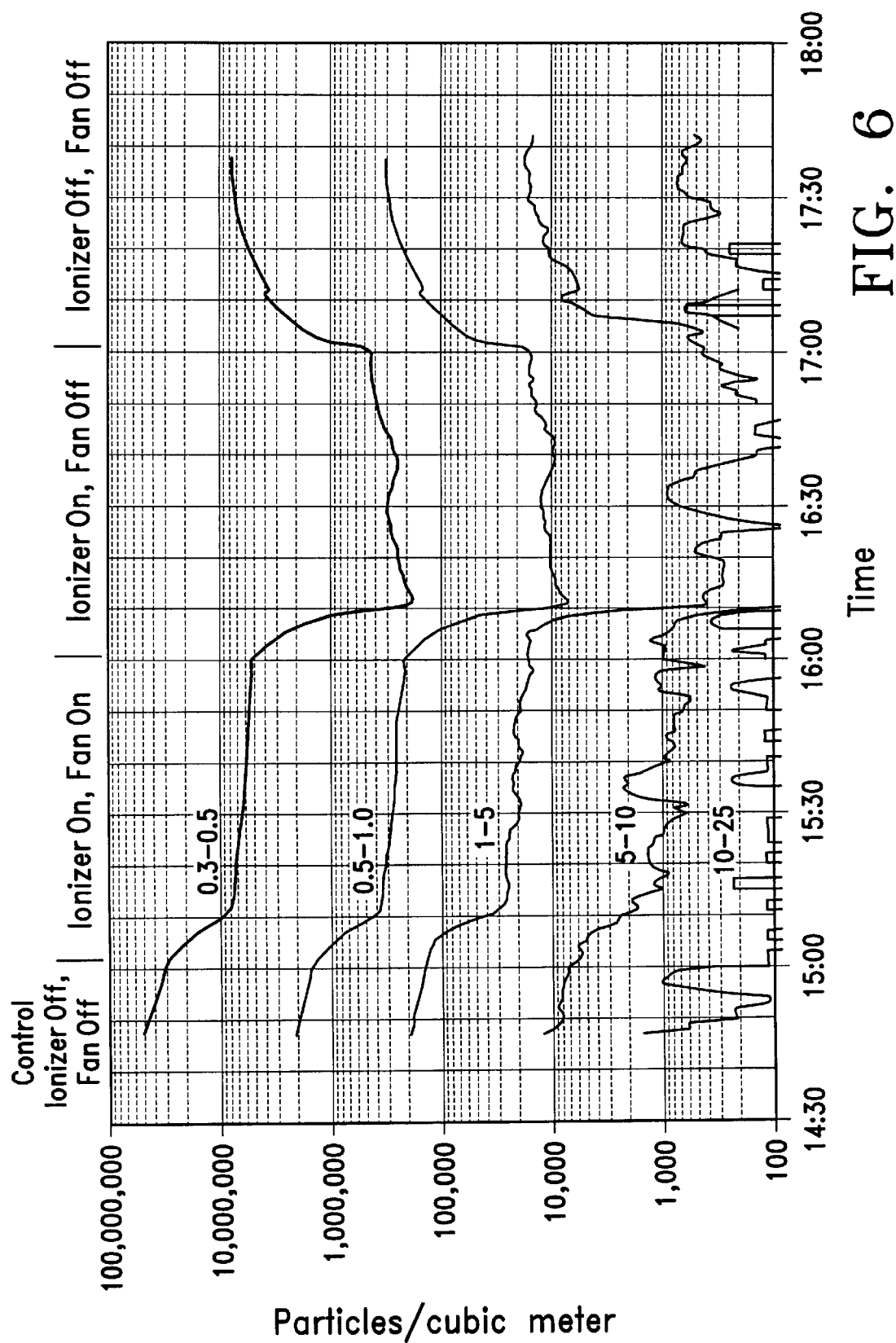
FIG. 6 is a log chart showing effects of treatments on particle counts for the 3 bar ionizer configuration in the hatching cabinet with ambient air. Particle size is in microns. The curves represent a running average of 5 samples to improve discrimination of the curves for the larger particle size ranges.
Figure 7:
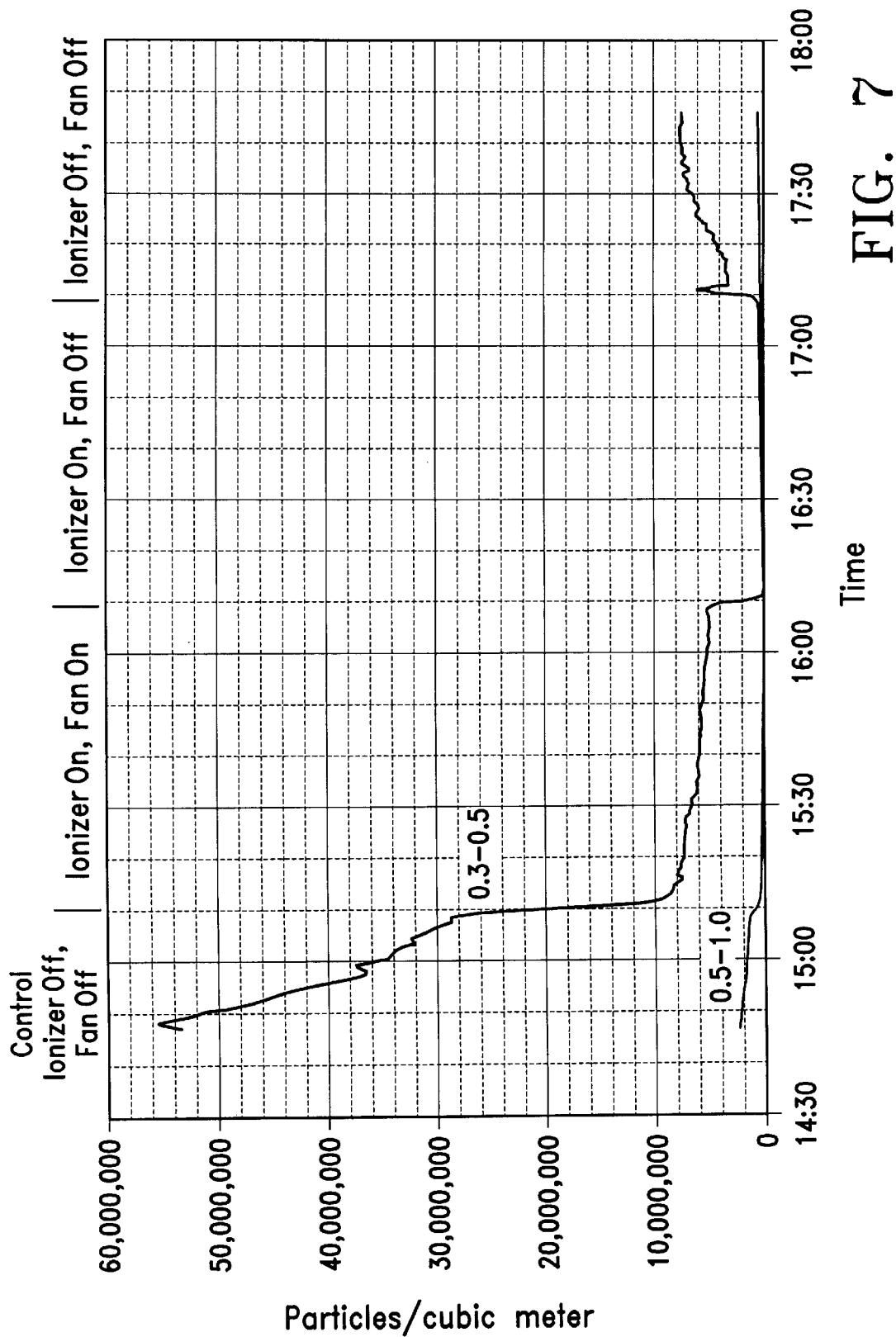
FIG. 7 is a linear chart showing effects of treatments on particle counts for the 3 bar configuration in the hatching cabinet with ambient air. Particle sizes are in microns.
Figure 8:
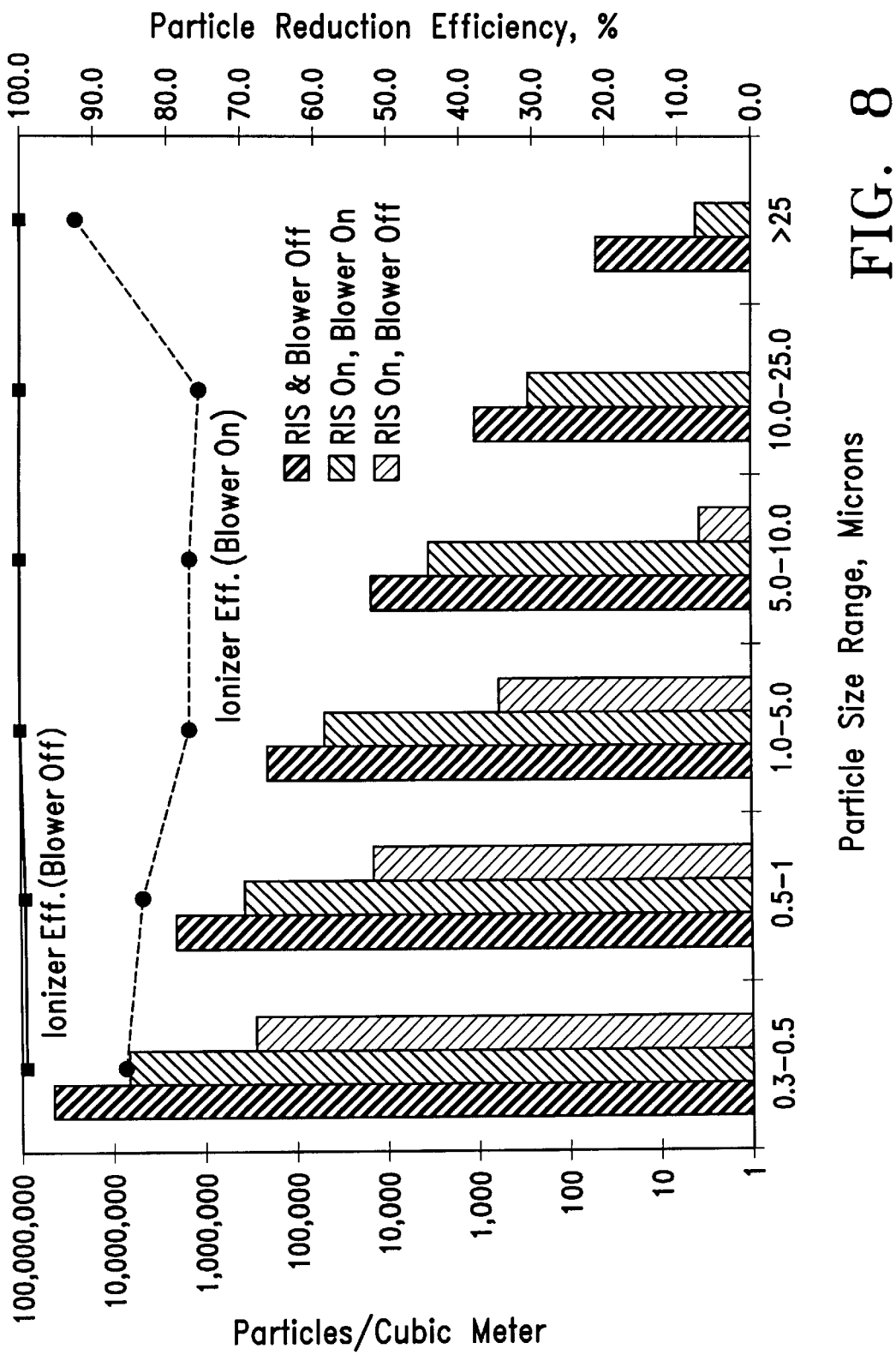
FIG. 8 is a bar graph showing efficiency and mean particle count for the 3 bar configuration treatments in the hatching with ambient air. Particle sizes are in microns.
Figure 9:
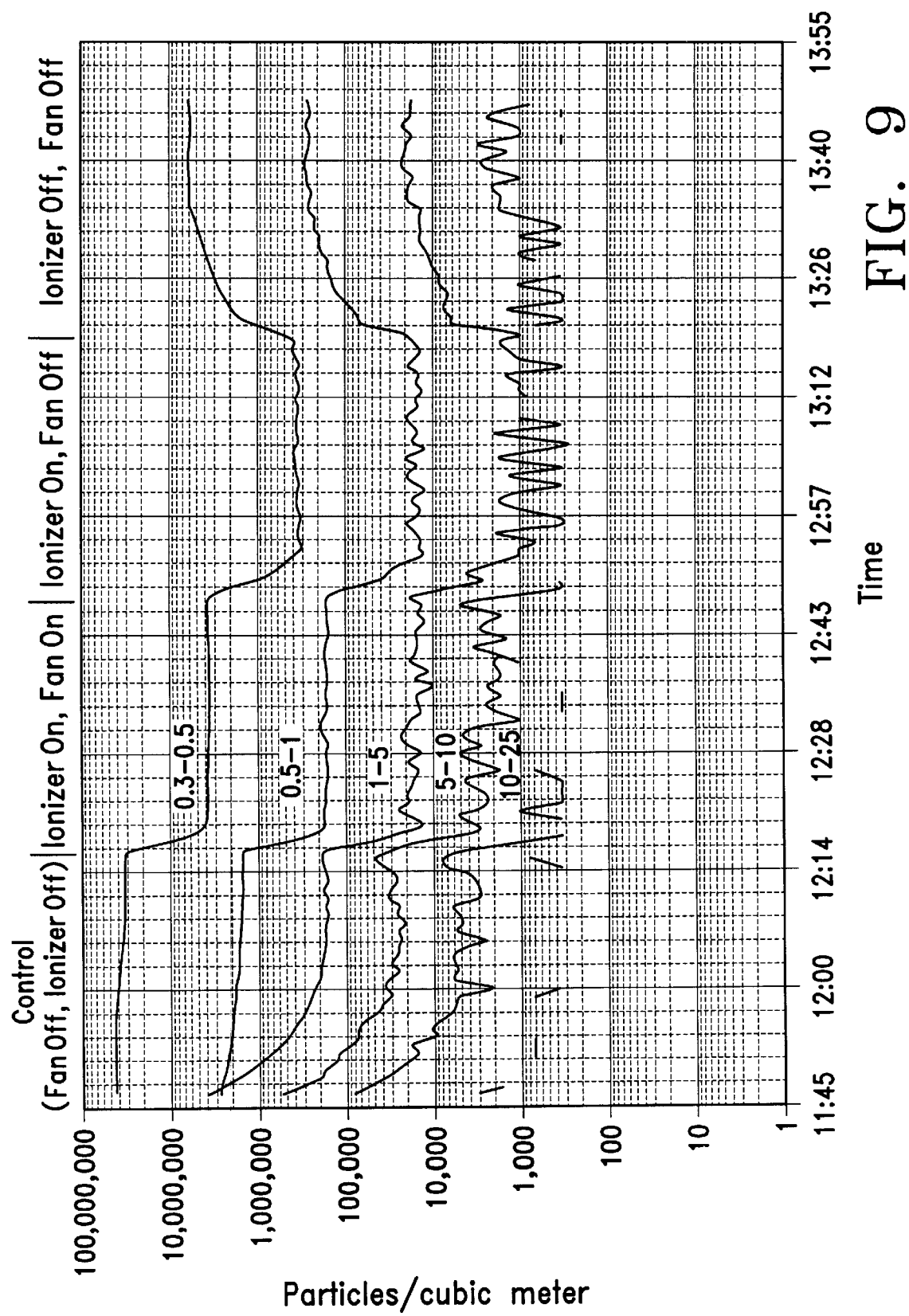
FIG. 9 is a log chart showing effects of treatments on particle counts for the 6 bar configuration in the hatching cabinet with ambient air. Particle sizes are in microns.
Figure 10:
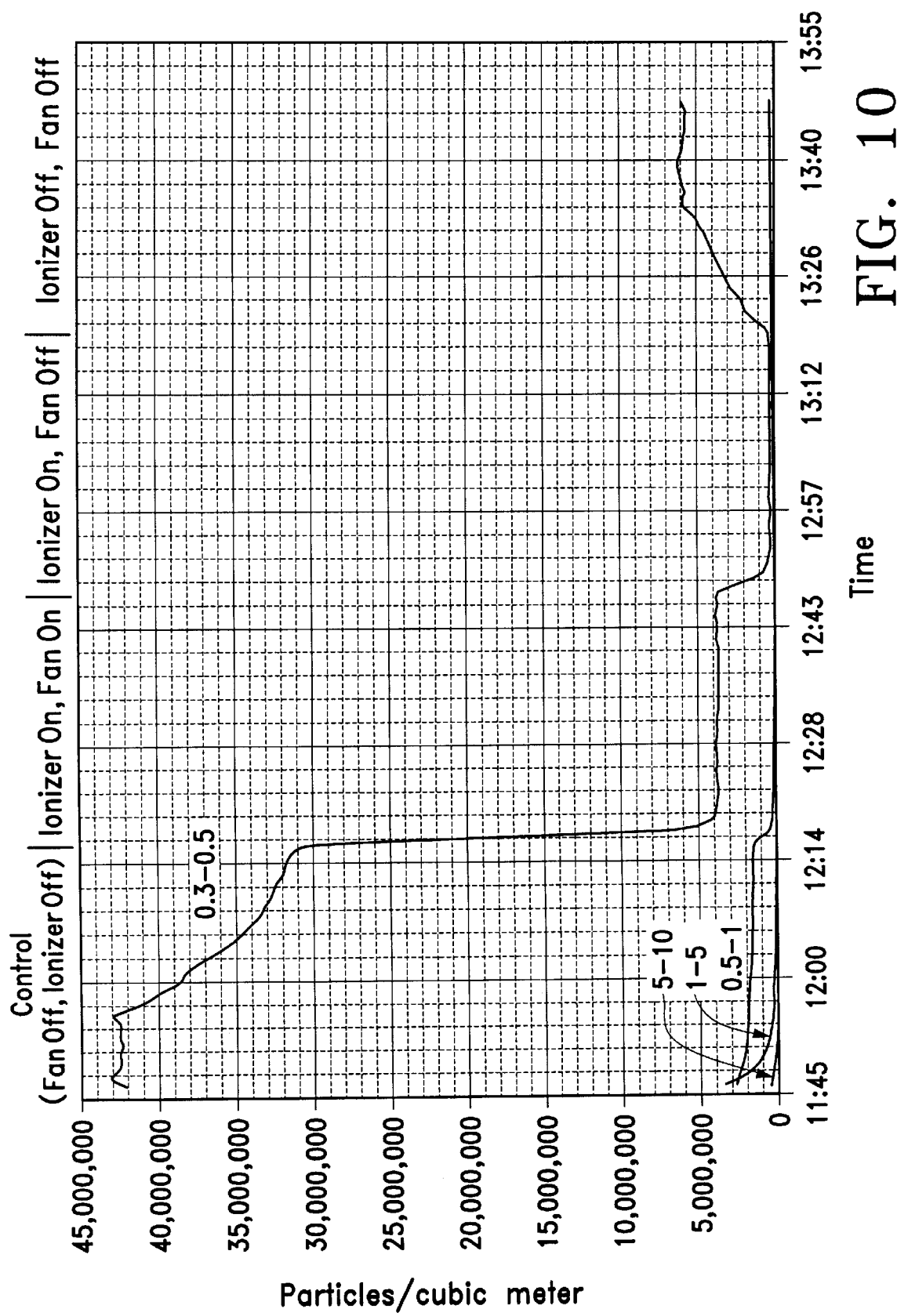
FIG. 10 is a linear chart showing effects of treatments on particle counts for the 6 bar configuration in the hatching cabinet with ambient air. Particle sizes are in microns.
Figure 11:
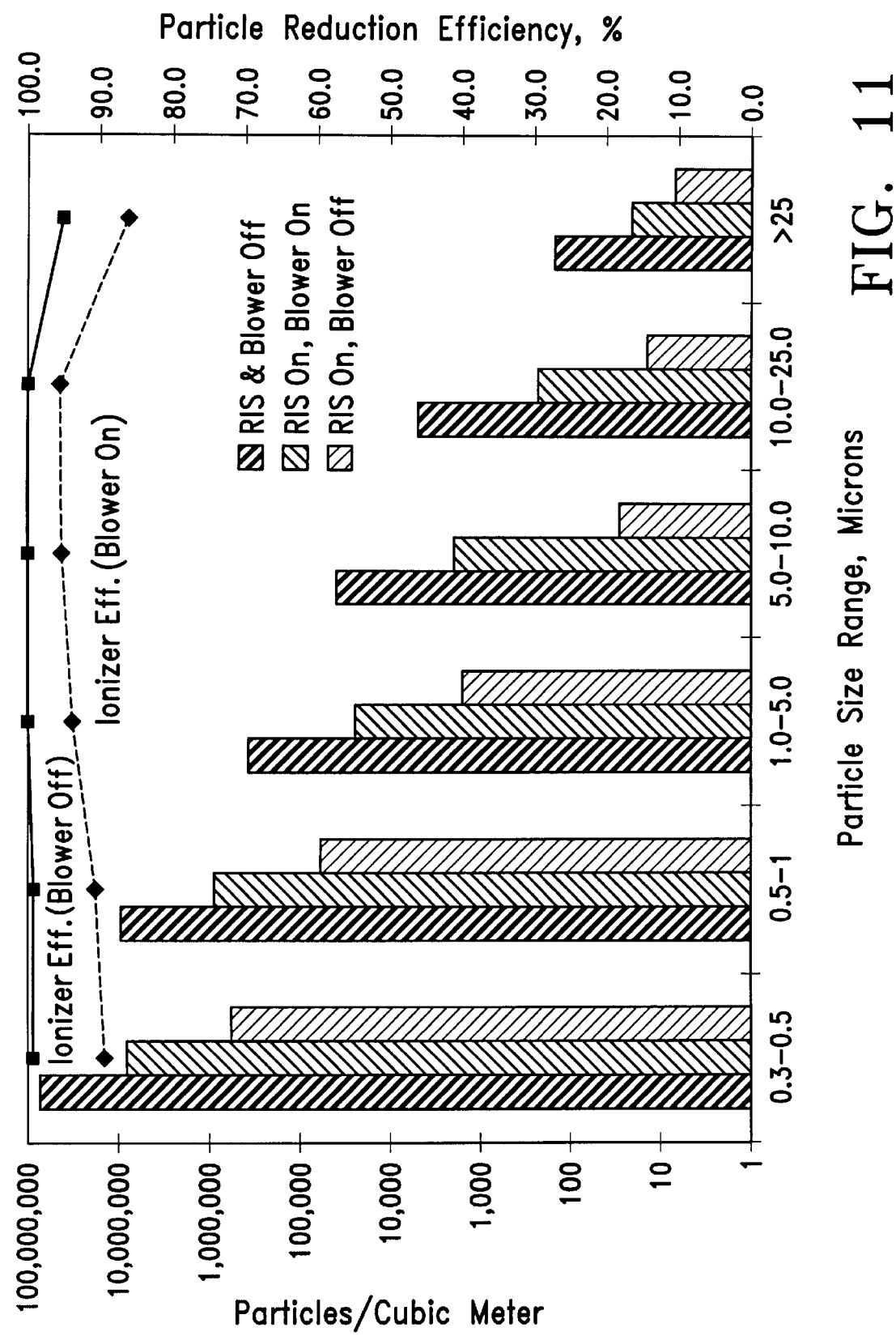
FIG. 11 is a bar graph showing efficiency and mean particle count for the 6 bar configuration in the hatching treatments with ambient air. Particle sizes are in microns.

Results are shown in FIGS. 6–8 and Table 1 for the 3 bar configuration and FIGS. 9–11 and Table 1 for the 6 bar configuration. Significant (P≧0.05) reductions in particle counts were achieved with the 6 bar configuration which removed particles with efficiencies which averaged about 92.9% for particles up to about 10 microns and about 90.8% for particles of about 10 microns and larger. Significant (P≦0.05) reductions in particle counts were also achieved with the 3 bar configuration which had an average particle reduction efficiency of about 80.1% for particles up to about 10 microns and larger. Most of the dust reduction by negative air ion generator 50 occurred within about 5 minutes of the time the generator 50 was turned on (FIGS. 6–7 and 9–10).

Substantial further reduction was obtained when the hatcher cabinet blower was turned off while generator 50 was still on (3rd interval, FIGS. 6–7 and 9–10), suggesting that the blower was reentraining an amount of dust equal to the count difference between the blower on and blower off conditions. This additional reduction for the 3 bar configuration is shown in FIG. 8 and Table 1 below. It resulted in particle counts which were significantly (P≦0.05) lower than counts resulting from generator 50 alone for particles up to about 25 microns. The effect of turning the blower off for the 6 bar configuration is shown in FIG. 11 and Table 1 which resulted in significantly (P≦0.05) lower particle counts than generator 50 alone for particles up to about 1 micron and non-significant reductions (P>0.05) for particles above 1 micron. Combining the effects of generator 50 with the effect of reduced reentrainment with the blower off resulted in an overall average reduction of about 99.7% for the 3 bar configuration with Blower Off, and about 98.8% for the 6 bar configuration with Blower off (FIGS. 8 and 11). Particle counts during the 4th interval (hatcher blower and generator 50 off) increased to several times those of the 3rd interval (blower off, generator 50 on).

Figure 12:
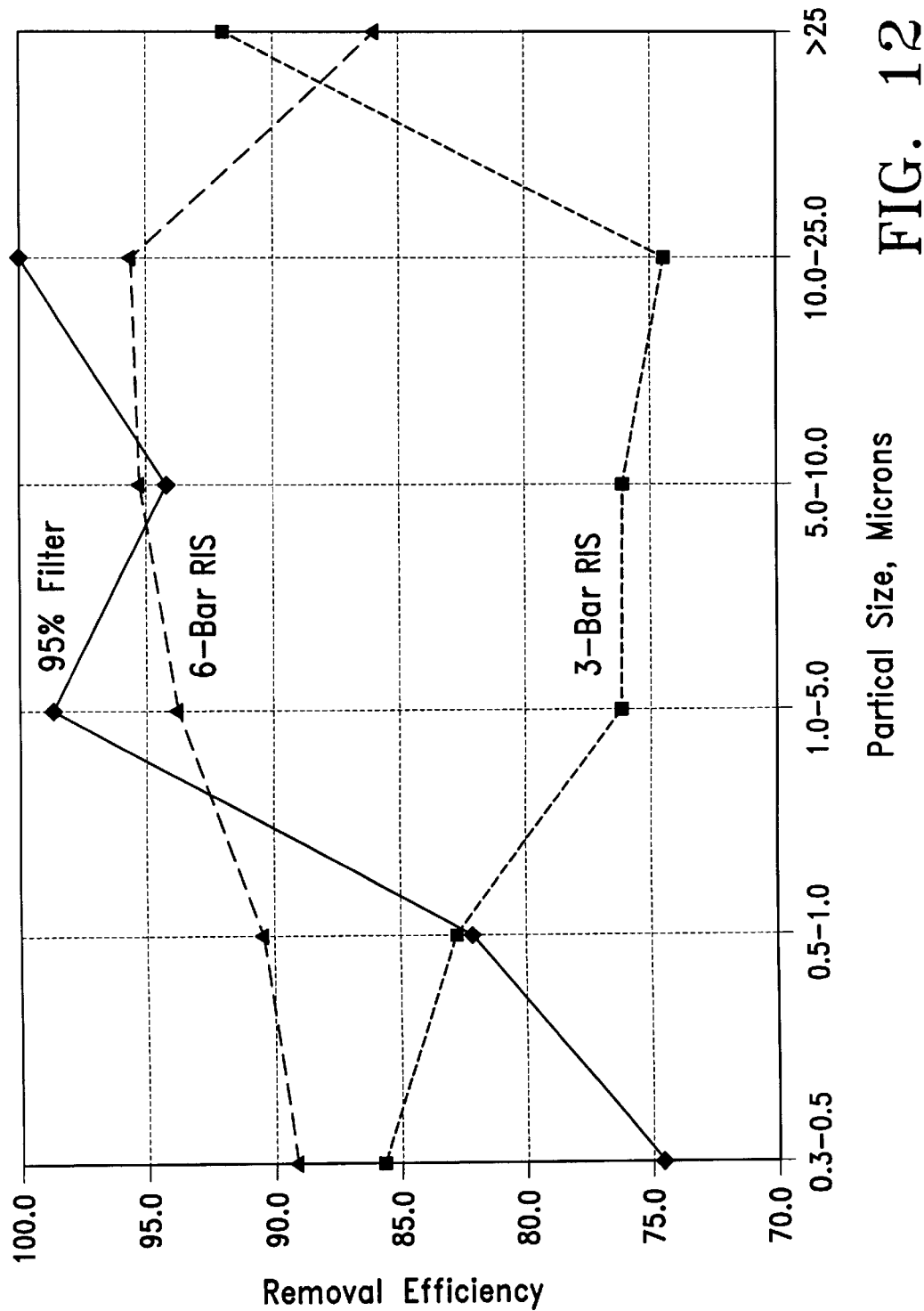
FIG. 12 is a graph showing comparison of particle removal efficiency for the 3 bar and 6 bar configurations to that of a 95% media filter with ambient air.

The efficiencies of generator 50 are compared in FIG. 12 to that of a 95% media filter in a series filter system (35% filter followed by 95% filter) described by Mitchell et al.

Figure 15:
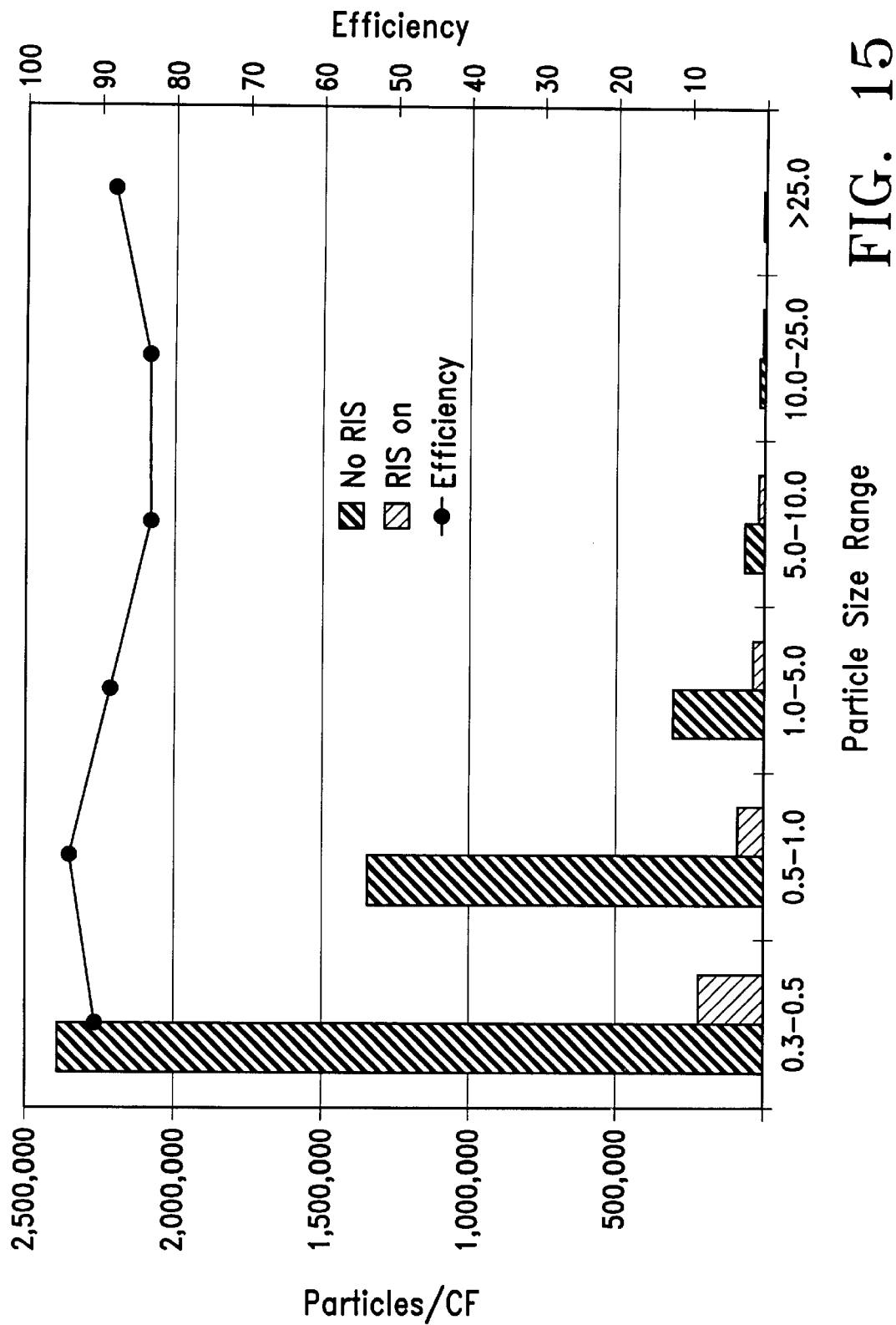
FIG. 15 is a graph showing average particle count and reduction efficiency during hatch for all size ranges measured.

(Avian Diseases, Volume 33, 792–800, 1989) for filtering incoming air to filtered-air positive pressure (FAPP) houses used to raise disease-free chickens. The overall efficiency of the 6 bar configuration was very close to that of a 95% media filter (92.2% vs. 91.5%). Note that airborne viruses are usually found on particles between about 3 and 6 microns and airborne bacteria are mostly found on particles of about >6 microns(Hugh-Jones et al., J. Hyg., Camb., Volume 71, 325–339, 1973). Preliminary measurements of dust generated in an operational hatching cabinet during the hatching period from day 18 to day 22 showed substantial increases over ambient levels of dust particles in the sizes up to about 10 microns.

ciencies ranging from about 100% in the early stages of hatch to about 80% near the end. The drop with time may be a result of the heavier dust load as more birds hatch out. Particle size reduction seemed to follow the same trend with efficiencies averaging about 98.7% on day 19 to about 82.8% on day 21. Particle count data and reduction efficiency are shown in FIG. 15. The efficiency of ion generator 50 for removing ambient dust is compared to that of a 95% media filter on FIG. 12 and it clearly indicates a favorable performance for generator 50 since 95% filters have been shown to block airborne transmission of Newcastle disease virus (Hopkins and Drury, 1971, supra). Effects of generator 50 used in this example on smoke generated by a smoke

TABLE 1

| Treatment | 0.3–0.5 | 0.5–1 | 1–5 | 5–10 | 10–25 | >25 |
|---|---|---|---|---|---|---|
| 3 - Bar Control | 45,996,570[a] | 1,992,544[a] | 195,696[a] | 12,755[a] | 933.3[a] | 39.22[a] |
| 3 - Bar Ionizer On, Fan On | 6,563,364[b] | 345,764[b] | 46,741[b] | 3,063[b] | 238.5[b] | 3.18b |
| 3 - Bar Ionizer On, Fan Off | 288,436[c] | 13,096[c] | 508.3[c] | 3.18[c] | 0.00[c] | 0.00[b] |
| 6 - Bar Control | 69,822,270[a] | 8,694,955[a] | 364,928[a] | 37,655[a] | 4,606.3[a] | 133.1[a] |
| 6 - Bar Ionizer On, Fan On | 7,467,009[b] | 827,220[b] | 22,779[b] | 1,808.4[b] | 204.4[b] | 18.6[b] |
| 6 - Bar Ionizer On, Fan Off | 554,316[c] | 55,421[c] | 1,433.2[b] | 26.1[b] | 13.1[b] | 6.5[b] |

Duncan's Range Analysis results of mean particle particles per $m^3$ by treatment and ionizer type. Means with different or non-overlapping superscript letters are significantly different ($P \leq 0.05$).

EXAMPLE 2

Duplicated experiments were conducted in an operational hatching cabinet, and particle size distribution and concentration were measured during the hatching process to characterize the amount and sizes of airborne particulate and the effectiveness of an electrostatic space charge on reducing airborne particulate matter in the hatching cabinet. An ion generator 50 with a 6 bar 11 configuration was suspended above the top hatching basket within a Natureform (NMC200) hatching cabinet 9 that was approximately 50% full of 18 day-old fertile broiler eggs containing developing embryos. Ion generator 50 operated continuously at about −20,000 V dc to generate a strong negative electrostatic charge throughout the cabinet from transfer through hatching on Day 21. Dust was collected in 2 grounded trays 8 containing approximately 1.5 inches of water and between about 2–3% of liquid JOY dishwashing detergent. One tray 8 was suspended above the top egg basket in the cabinet and a second tray 8 was placed on the floor of the hatching cabinet 9.

Particle count measurements were made at sampling intervals of about 15 minutes with a Climet CI-500 laser particle counter in 6 ranges: about 0.3 to 0.5, about 0.5 to 1.0, about 1.0 to 5.0, about 10.0 to 25.0 and about >25 microns; at a fixed rate of about 2.83 Liters/minute (about 0.1 $ft^3$/minute). Dust concentration was measured at sampling intervals of about 2 minutes with a TSI DustTrak instrument at about 1.7 Liters/minute. The DustTrak had a range of about 0.001 to about 100 $mg/m^3$. The sampling tubes for the CI-500 and the DustTrak were located inside the hatching cabinet along the left side, midway between the ceiling and floor, and between the side wall and the sides of the hatching baskets.

Figure 13:
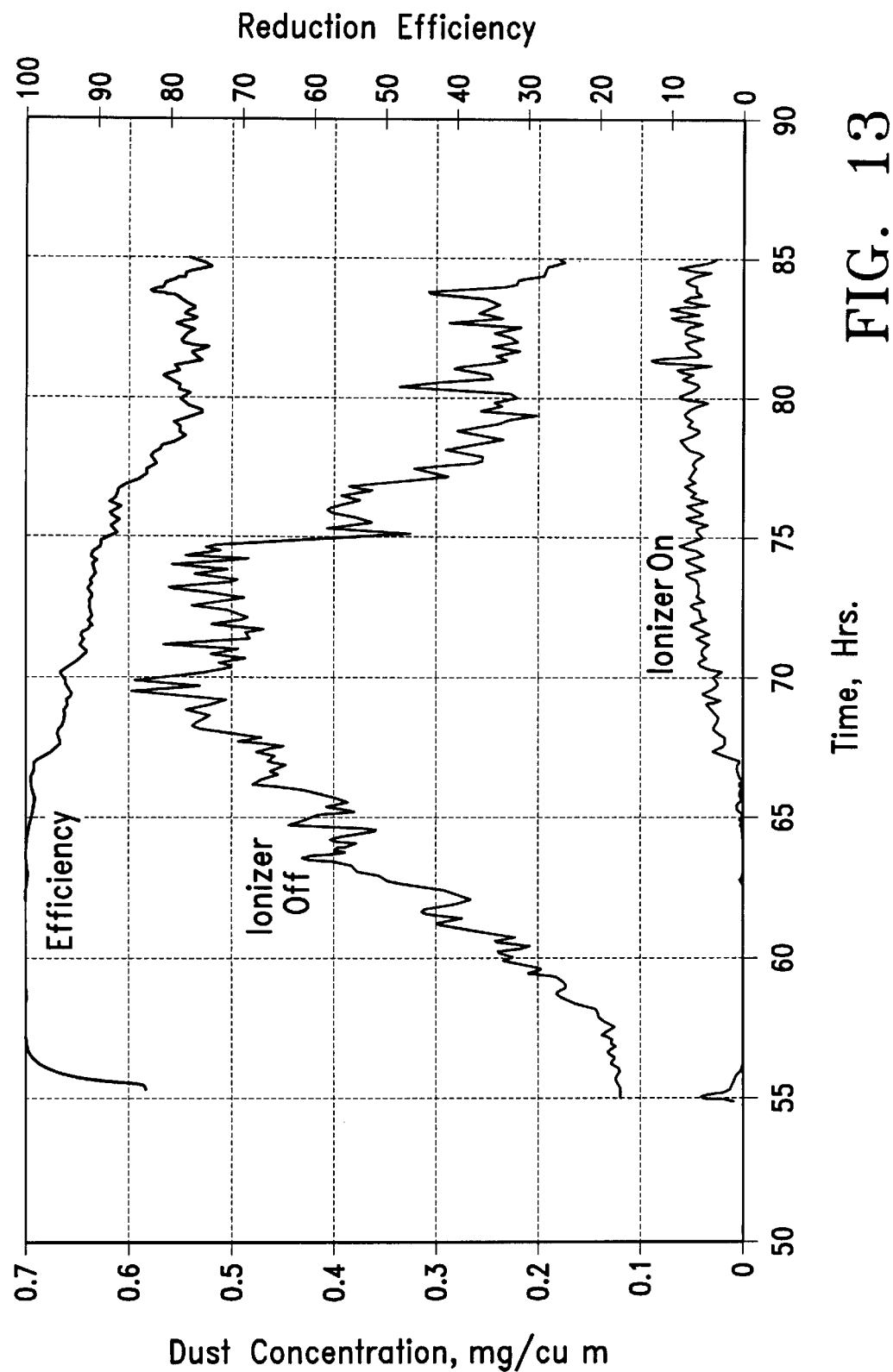
FIG. 13 is a graph showing hourly dust concentration during hatching with and without system 40, and reduction efficiency.
Figure 14:
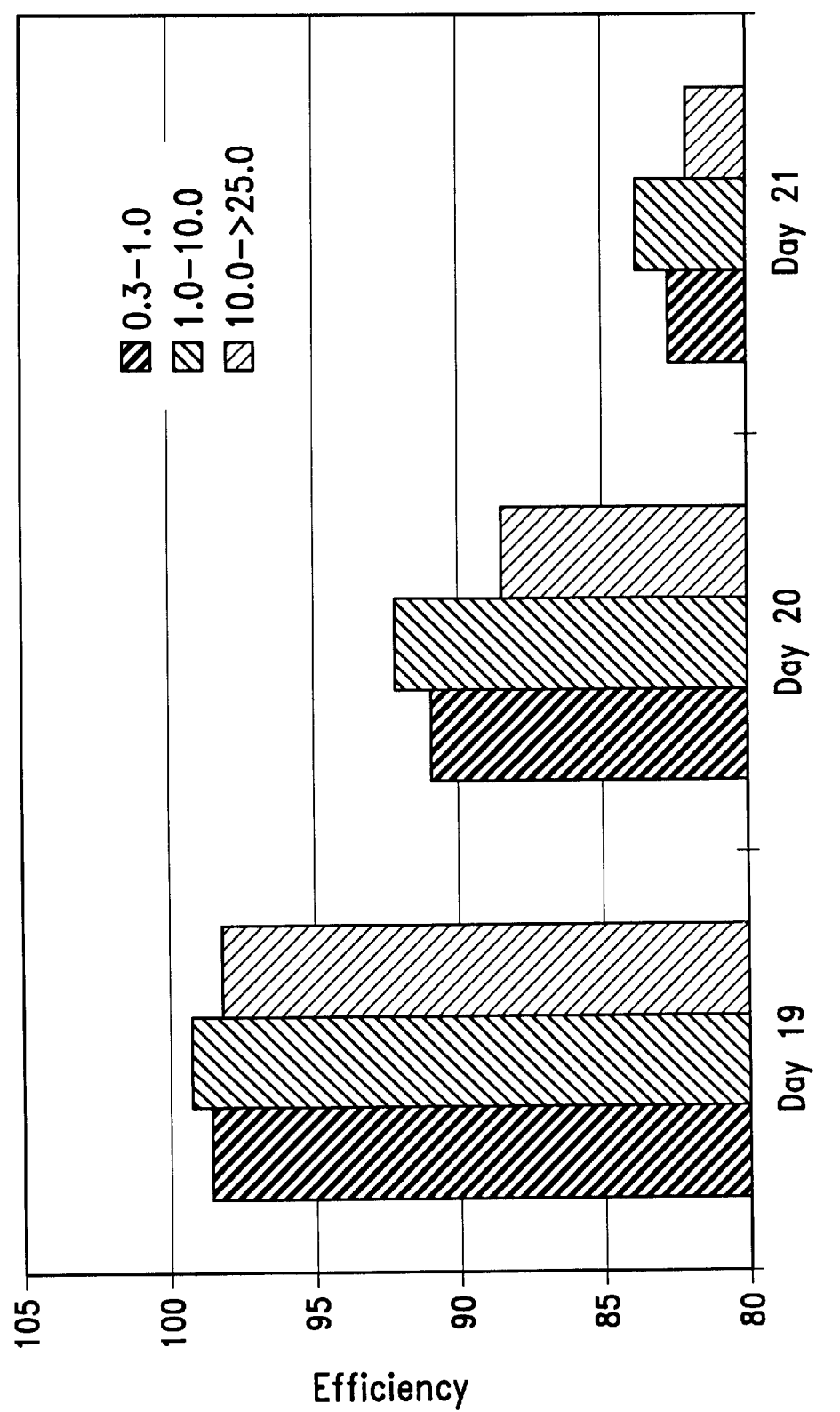
FIG. 14 is a graph showing average particle count reduction efficiency by day during hatching for 3 particle size ranges.
Figure 16:
FIG. 16 is a photograph showing smoke diffusion over a grounded water tray; with system 40 off.
Figure 17:
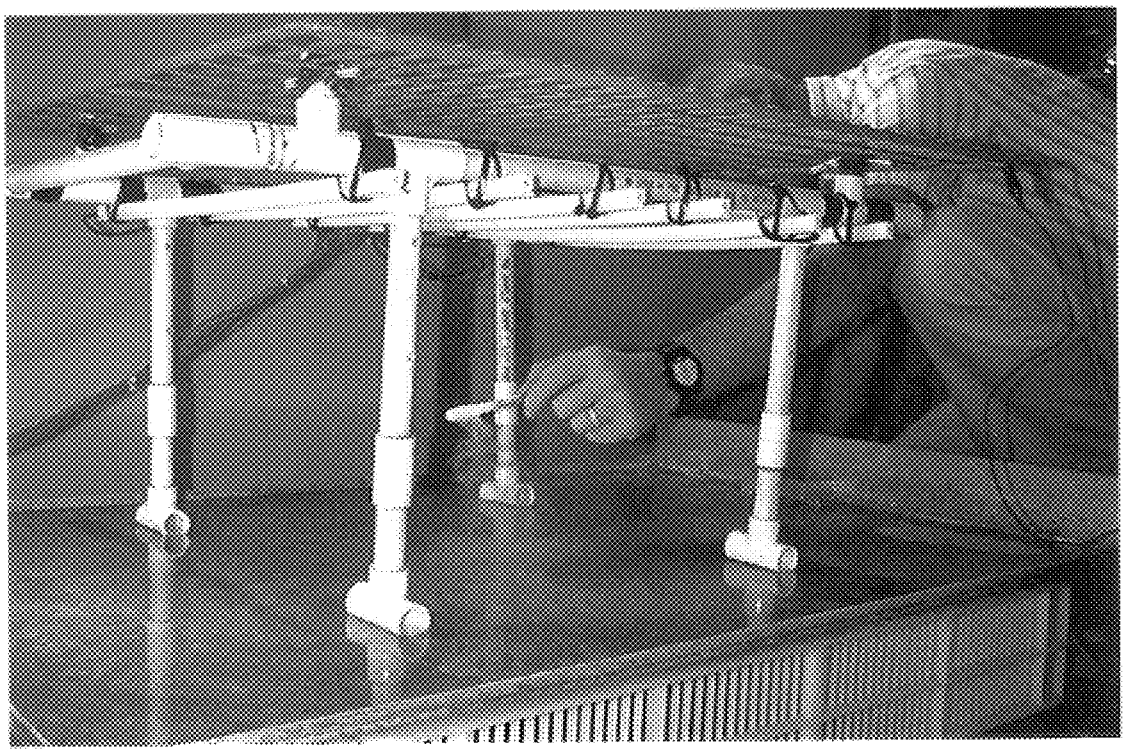
FIG. 17 is a photograph showing smoke diffusion with generator 50 on over a grounded water tray.
Figure 18:
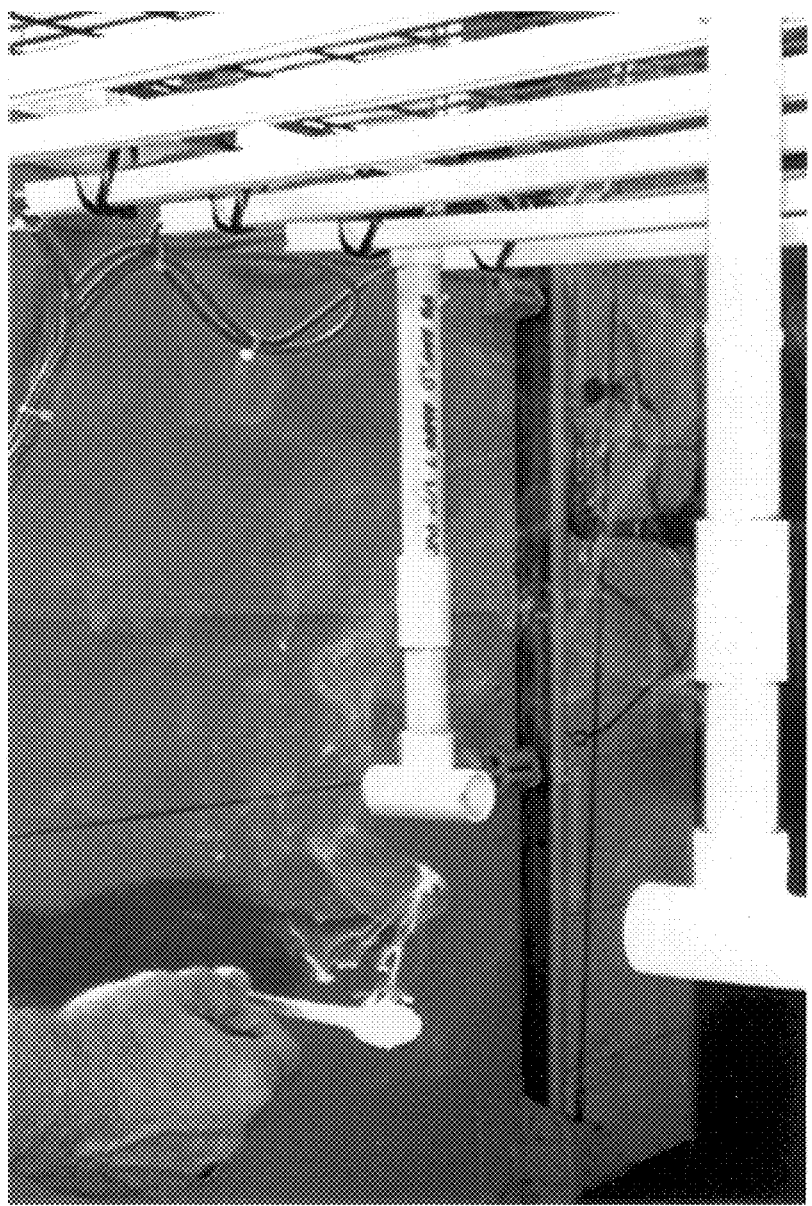
Figure 19:
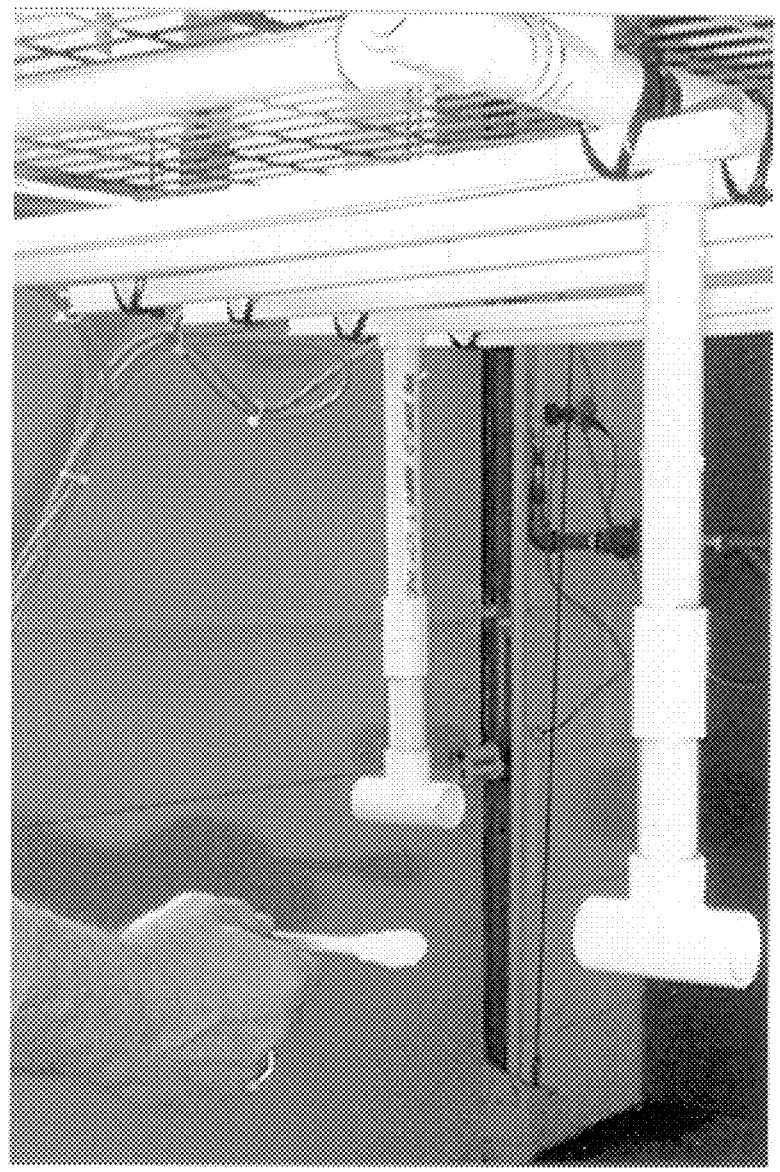
FIG. 19 is a photograph showing smoke diffusion below a suspended generator 50 with generator off.

Generator 50 effects are shown in FIG. 13 for dust concentration and FIGS. 14–15 for particle counts. Dust removal based on dust concentration (FIG. 13) shows efficiencies stick are shown in FIGS. 16–19. In FIGS. 16 and 17, with generator 50 sitting on top of a grounded water tray, turning generator 50 on (FIG. 17) causes the smoke to be drawn to the water while generator 50 off state (FIG. 16) causes the smoke to diffuse into the room. In FIGS. 18 and 19 with generator 50 suspended several feet above the floor, turning generator 50 on (FIG. 18) causes the smoke to be drawn to the ground plane 4 (just above the ionizer bars 11) and appear to disappear while generator 50 off state (FIG. 19) allows the smoke to diffuse into the room. These visual results correspond to the effects seen in the hatching cabinets when generator 50 was turned on.

EXAMPLE 3

Three trials were conducted to evaluate the effectiveness of an electrostatic space charge on the levels of total aerobic bacteria (TPC) and Enterobacteriaceae (ENT) within the hatching cabinet. A negative air ion generator 50 was placed above the top hatching basket within a Natureform (NMC200) hatching cabinet that was approximately 50% full of 18-day-old broiler eggs containing developing embryos as described above in Example 2. Generator 50 operated continuously at −20,000 volts dc to generate a strong electrostatic charge throughout the cabinet from transfer through hatching on day 21. Dust was collected in grounded trays 8 containing water and between about 2–3% of JOY dishwashing detergent as described above in Example 2. An adjacent hatching cabinet served as a non-treated control. Air samples were collected daily by inverting brain heart infusion agar plates for TPC and violet red bile agar plates with the addition of 1% glucose plates for ENT over the exhaust air vent of the hatching cabinets for approximately five minutes. Plates were incubated at approximately 35° C. for about 48 hours. Approximately 10 chicks were sampled from each hatching basket on about day 21 and grown out to about 7 days of age in isolation cabinets. At about 7 days, the chick cecas were collected and assayed to determine whether they were positive for Salmonella.

Figure 20:
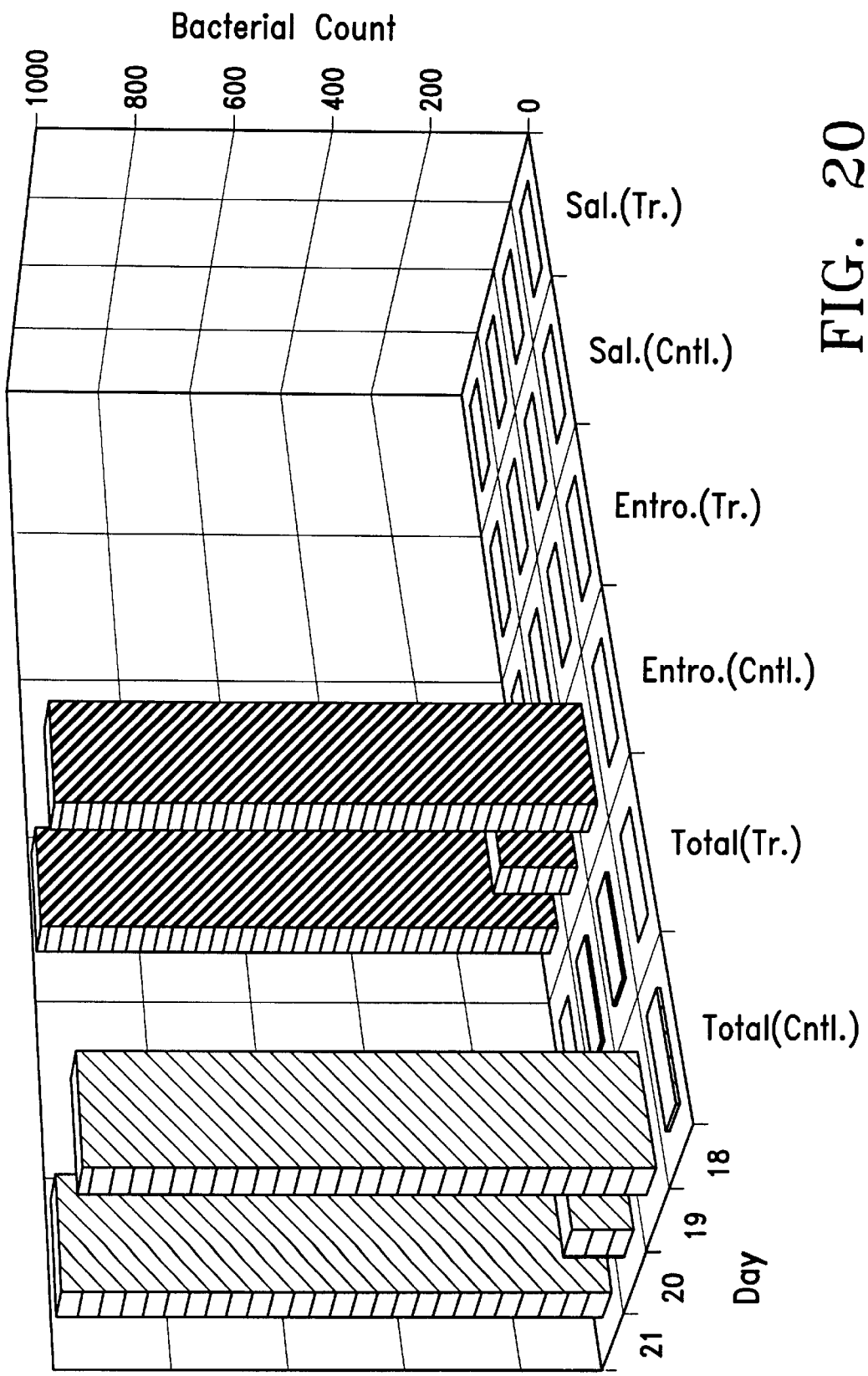
FIG. 20 is a graph showing system 40 effects on airborne bacteria.
Figure 21:
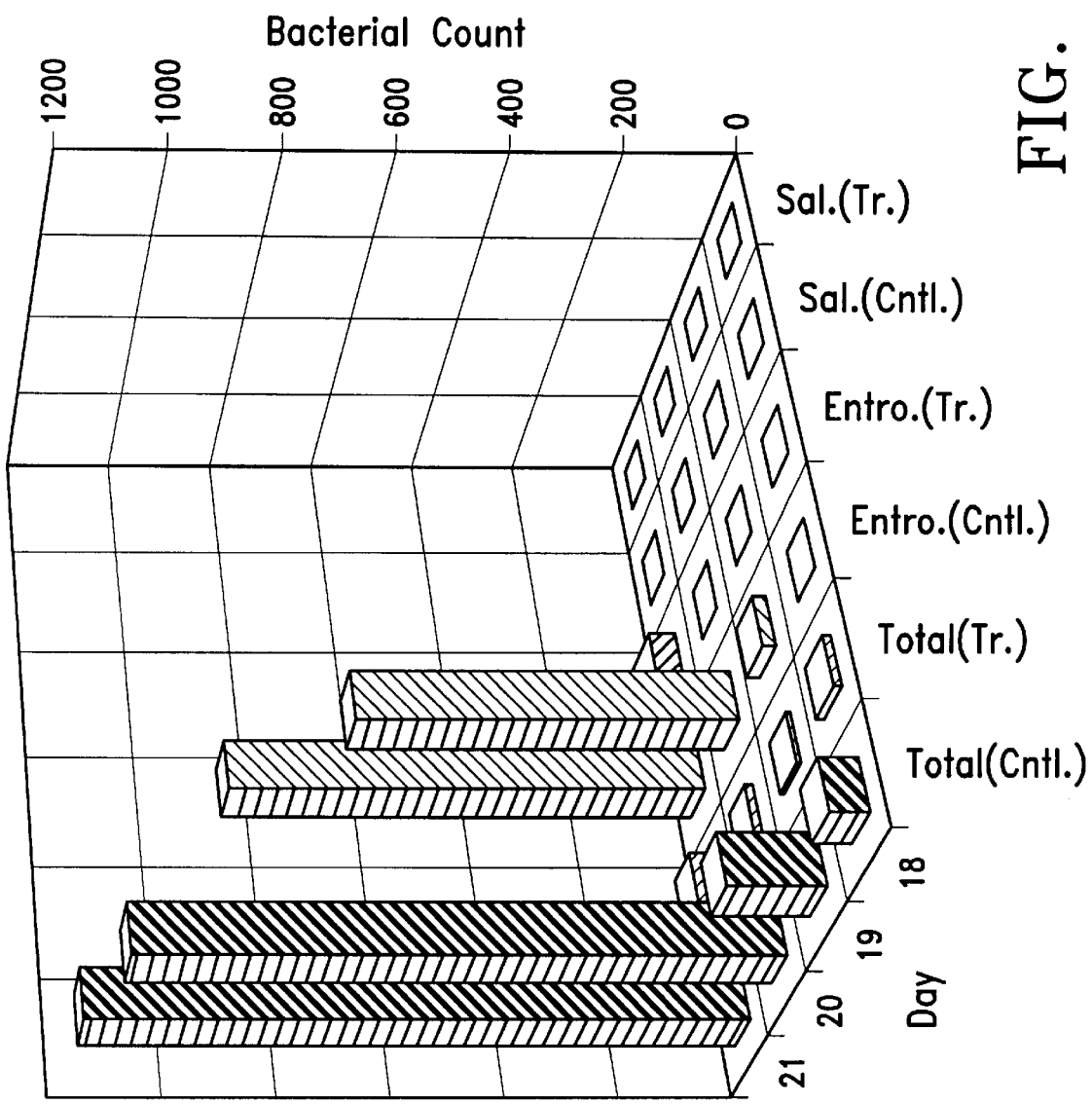
FIG. 21 is a graph showing system 40 effects on airborne bacteria.
Figure 22:
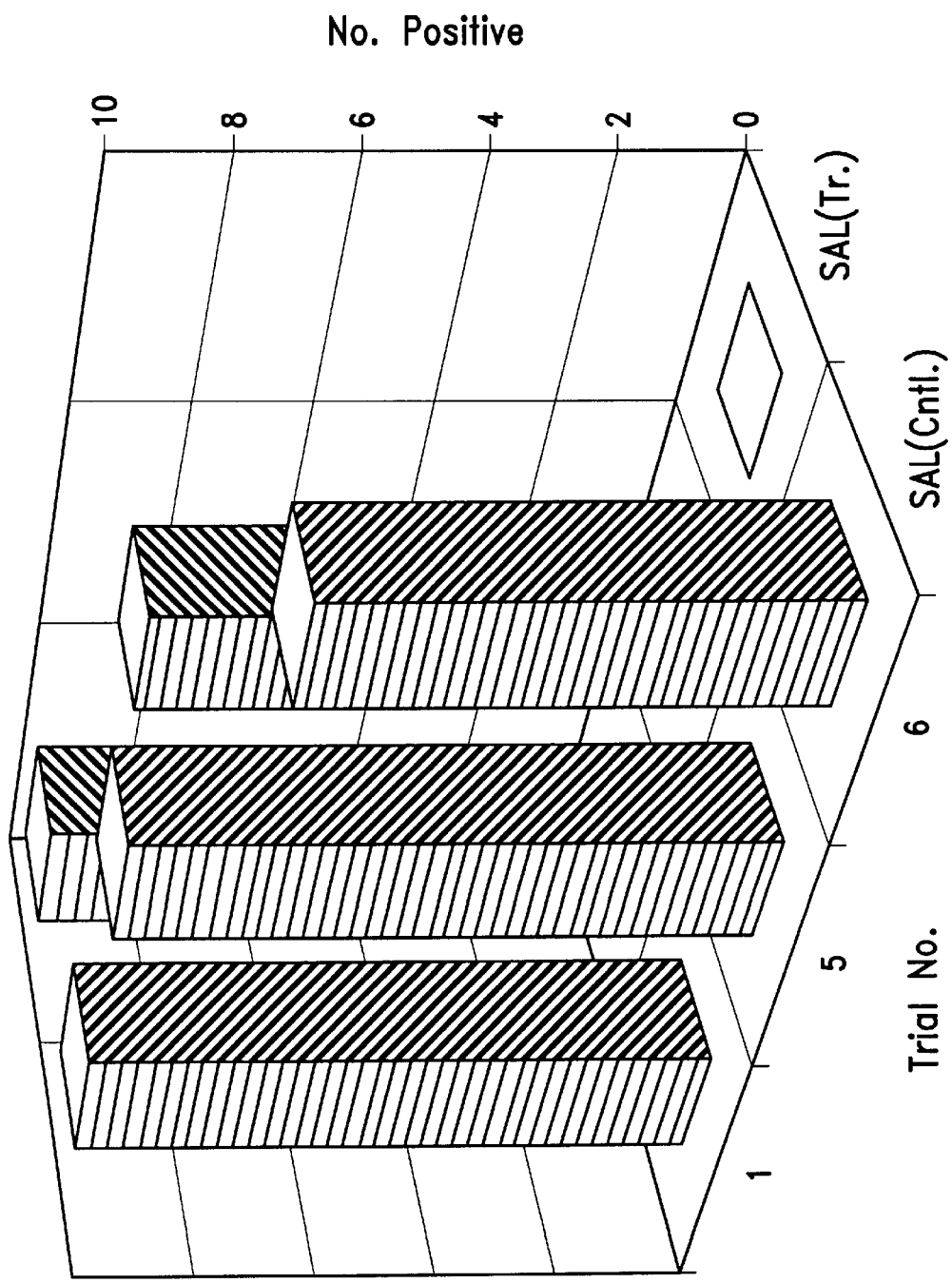
FIG. 22 is a graph showing Salmonella transmission based on 7 day old chicks from a hatching cabinet treated with system 40.

Results are shown in FIGS. 20–22. Overall, treatment with generator 50 reduced bacteria counts for total aerobic bacteria and Enterobacteriaceae by about 90–99%, compared to the nontreated control values (FIGS. 20–21). Trials 1 and 5 where generator 50 was turned off prior to the chicks being removed resulted in no significant reduction of positive chicks at 7 days of age for the treated (generator) vs. the non-treated cabinets since turning generator 50 off prior to chick removal caused contaminated dust to fall into the cabinet (FIG. 22). In Trial 6 where ion generator 50 was not turned off until chicks were removed, the treatment cabinet had no positive chicks and the control cabinet had 8 positive chicks (FIG. 22).

EXAMPLE 4

The effectiveness of an ion generator 50 with six ionizer bars 11 with attached ground plane 4 was tested in an animal room with floor dimensions of approximately 15 ft.×22 ft. and a volume of about 484 ft$^3$. Preliminary duplicated tests involved the use of a chemical smoke stick that was discharged inside of a treated room with generator 50 running at −30 kV dc and left there for 30 minutes before it was removed. The same smoke exposure was made to an untreated (control) room. Particle count measurements were made at sampling intervals of about one minute with a Climet CI-500 laser particle counter in the 6 ranges described above in Example 2 at a fixed sampling rate of about 2.83 L/minute (0.1 ft$^3$). Dust concentration was measured at sampling intervals of about one minute with a TSI DustTrak instrument which sampled at about 1.7 L/minute. The DustTrak has a range of about 0.001 to about 100 mg/m$^3$ and a resolution of about 0.001 mg/m$^3$. Measurements of dust concentration and particle counts were made for about 60–70 minutes.

Figure 23:
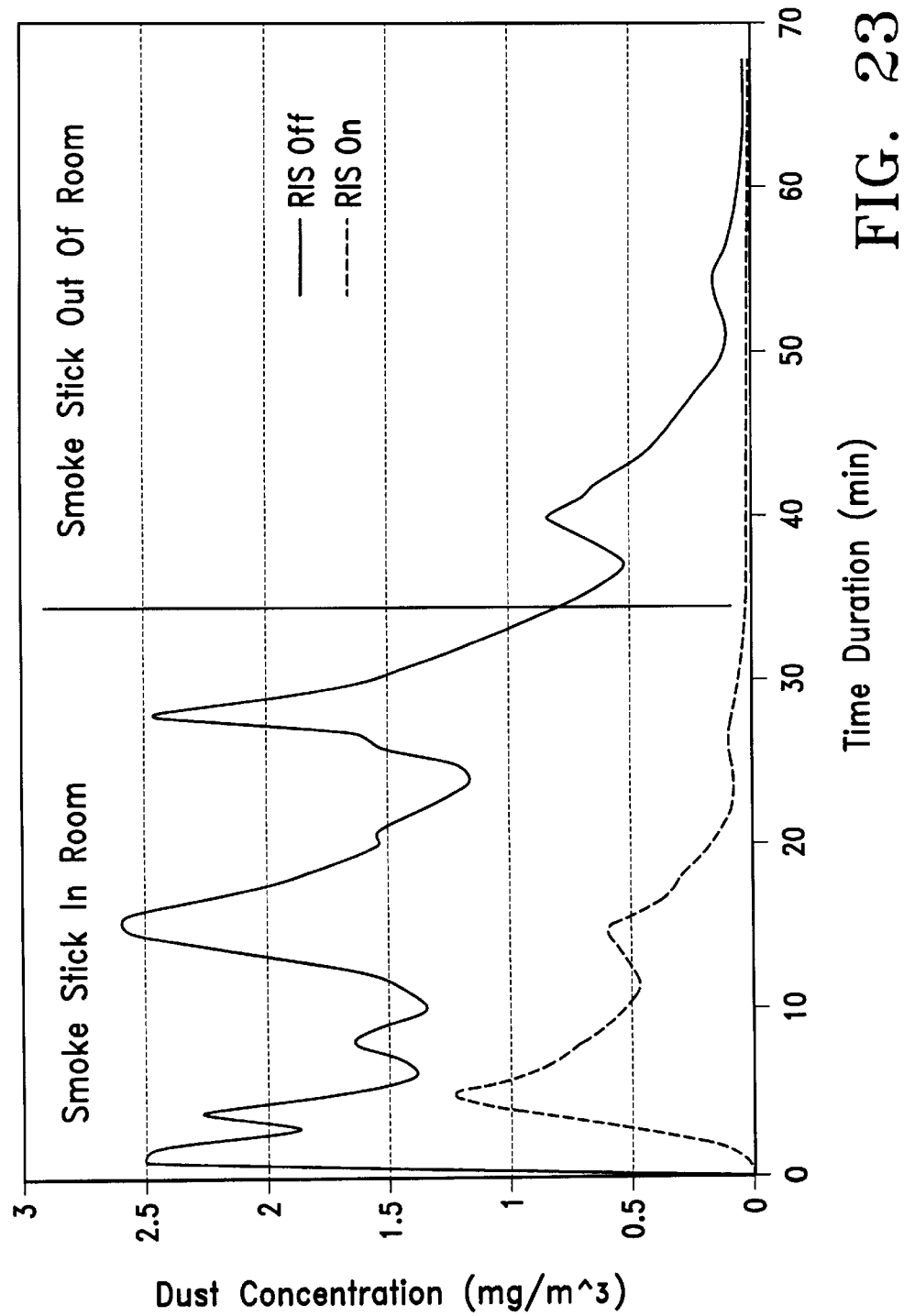
FIG. 23 is a graph showing a smoke test in a room of a building with and without generator 50.

Results are shown in FIG. 23 for dust concentration. The average dust reduction of the treated room compared to the control room during the approximately 30 minute period when the smoke stick was in the room (high concentration-average dust concentration is approximately more than four times higher than that in a typical occupied poultry room or in a hatching cabinet) was approximately 72%. For the approximately 30 minute period when the smoke stick was out of the room (moderate concentration-average dust concentration is similar to that in a typical poultry room or in a hatching cabinet), the treatment reduction efficiency was approximately 91%. In a later experiment in the same room with mature caged layers infected with *Salmonella enteritidis* (SE), air samples taken with petri dishes showed generator 50 treatment reduced SE counts by an average of about 82% during the approximately three days following cleaning of generator 50. During this same period, SE counts in the treatment room on 12 plates per day exceeded 1 colony of SE per plate only once compared to about 18 times in the control room.

EXAMPLE 5

Figure 24B:
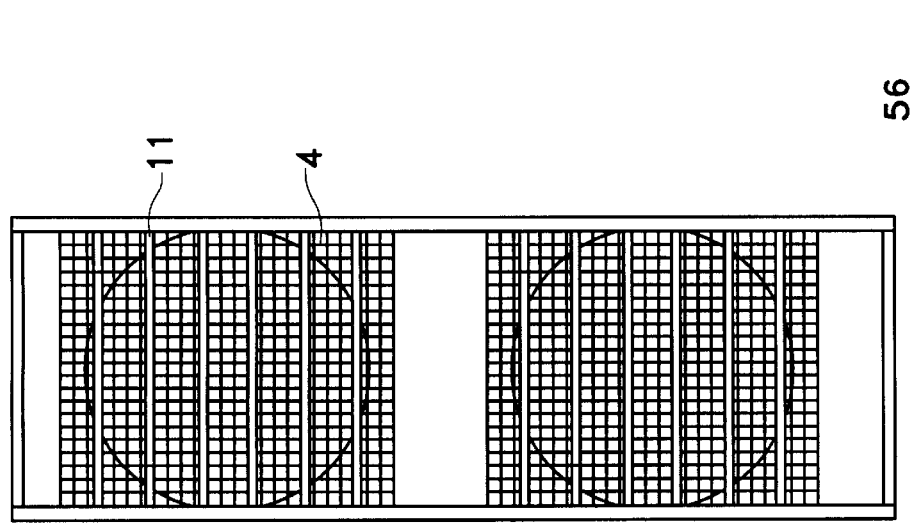
FIG. 24b is a top view of ground plane 4 and ionizer bars 11 in front of fans 10 of a large commercial hatching cabinet.
Figure 24A:
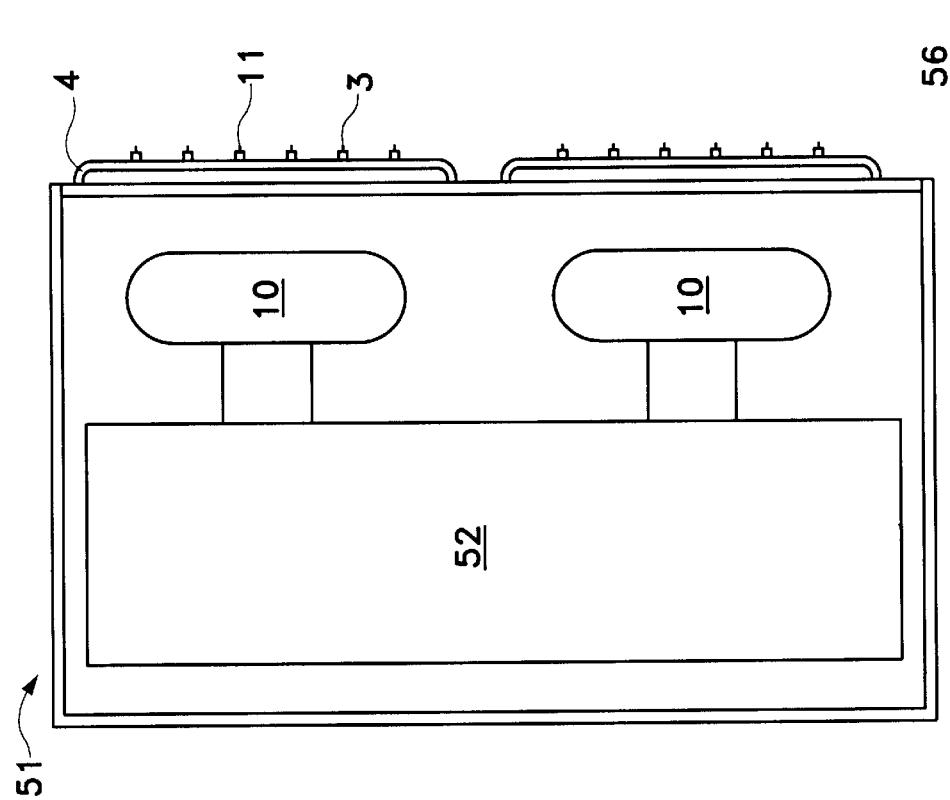
FIG. 24a illustrates the layout of ion generators 50 in a large commercial hatching cabinet showing ionizer bars 11, needle electrodes 3, ground plane 4, air handling unit 51, cooling coils 52, and fan 10.

The effectiveness of ion generator 50 with 12 ionizer bars 11 with attached ground plane 4 was tested at approximately −30 kV in a commercial hatching cabinet in a commercial hatchery (FIG. 24). The cabinet was approximately 130" wide, 65" deep and 74" high. Ground plane 4 is a grid ground plane with a grid size of approximately 1 inch by 1 inch. It is attached approximately three inches from ionizing bars 11. Two generators 50 are mounted in the cabinet 9 each approximately ½ inch in front of fans 10, which are located in front of cooling coils and heating elements 52, by attaching frame 6 to air handling unit 51 of cabinet 9. Each generator 50 has a dust reduction system 40 including five spray nozzles 20 mounted above and approximately 1 inch in front of a metal dust collection plate 24 which is attached to the back wall of cabinet 9 each next to a hatching cabinet exhaust port 23 (FIG. 25). A trough and drain 13 is located below plate 24 on the floor of cabinet 9 to collect water and dust from metal plate 24.

Figure 26:
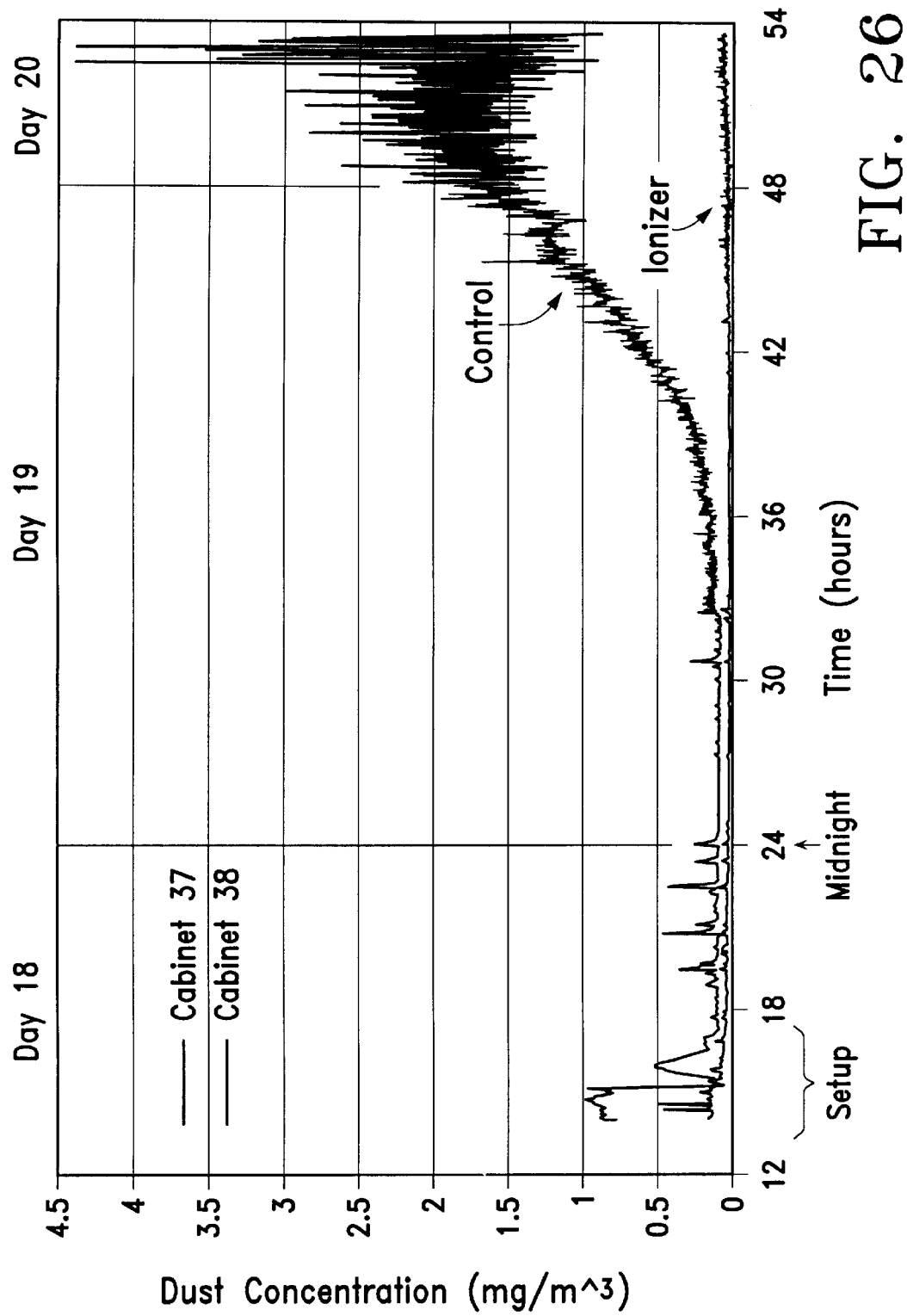
FIG. 26 is a graph showing dust concentration for an ionizer treated commercial hatcher versus a control hatcher, each with 14,500 eggs.

Generator 50 was operated continuously at about −30 kV to generate a strong negative electrostatic charge throughout the hatcher from transfer of eggs on day 18 through hatching on Day 21. Dust was collected on the hatcher surfaces including ground plane 4. It was loaded to its capacity of 14,500 fertile 18-day-old eggs. Dust concentration measurements were performed as in Example 2 using a TSI Dust-Trak. The DustTrak has to be cleaned daily to prevent plugging. Dust measurements in two duplicated trials from day 18 until hatch at day 21 demonstrated significant dust reduction due to the ionizer treatment compared to the control cabinet. Results, shown in FIG. 26, show very significant reductions in dust.

The foregoing description is for the purpose of illustration. Such detail is solely for that purpose and those skilled in the art can make variations therein without departing from the spirit and scope of the invention.

INDEX OF THE ELEMENTS

1. Electrical Splice Connector
2. High Voltage Insulated Wire
3. Needle Electrode
4. Ground Plane
5. Ground Wire
6. Non-Conductive PVC Frame
7. Water and Degreaser Solution
8. Grounded Water Tray
9. Hatching Cabinet For Fertile Poultry Eggs
10. Ventilation and Recirculation Fan
11. Ionizer Bars
12. Air Inlet Flow Control Damper
13. Trough and Drain for Back Plate Rinse Water
14. Air Outlet Flow Control Damper
16. Electrical Controls for Hatching Cabinet
18. Guide Rails for Plastic Hatching Trays (Grounded)
20. Water Spray Nozzles for Metal Dust Collector Plate
22. Metal Splash Guard for Spray Nozzles
23. Hatching Cabinet Exhaust Port
24. Metal Dust Collector Plate
26. Room Air Outlet
28. Cages for Poultry Layers
30. Room Exhaust Register
32. Room Door
34. Controlled Environment Poultry Rearing Room
40. Dust Reduction System
50. Negative Air Ion Generator
51. Air Handling Unit
52. Cooling Coils and Heating Elements
54. Air Inlet Duct
56. Floor

We claim:

1. A space charge system for reducing airborne contaminants comprising
   (a) at least one negative air ion generator wherein said generator includes at least one ionizing electrode,
   (b) a ground plane perpendicular and proximate to said at least one electrode wherein said at least one electrode is facing away from said ground plane, and at a distance apart to create an electrostatic field which reduces airborne particulates without creating an arc, and
   (c) a source of power to effect said ionization from said electrode;

wherein said system generates electrostatic charge throughout an enclosed space outside of said system.

2. The system of claim 1 further comprising about 3 to 12 ionizer bars containing a plurality of electrodes.

3. The system of claim 1 wherein said system further comprises at least one dust collection device.

4. The system of claim 1 wherein said at least one electrode is an ionizing needle electrode.

5. The system of claim 3 wherein said dust collection device is at least one tray containing an aqueous composition.

6. The system of claim 5 wherein said aqueous composition includes a degreaser.

7. The system of claim 3 wherein said dust collection device includes a metal plate and a means for applying water to said plate.

8. The system of claim 7 wherein said means for applying water to said plate is spray nozzles.

9. The system of claim 7 wherein said means for applying water to said plate is a pipe containing holes for emitting water.

10. The system of claim 3 wherein said dust collection device is said ground plane and surfaces of a room-sized enclosed space.

11. The system of claim 3 wherein said dust collection device is at least one tray containing an aqueous composition wherein said at least one tray is located above said generator and ground plane.

12. The system of claim 11 wherein said dust collection device further comprises a second tray located at the bottom of the enclosed space below said generator and ground plane.

13. The system of claim 3 wherein said dust collection device comprises at least one grounded metal plate attached to at least one wall of said enclosed space.

14. The system of claim 13 further comprising spray nozzles mounted as selected from the group consisting of beside the plate, above the plate, and both beside and above the plate.

15. The system of claim 1 wherein said generator further includes a supporting frame.

16. A space charge system for reducing airborne contaminants comprising
   (a) at least one negative air ion generator wherein said generator includes at least one ionizing electrode,
   (b) a ground plane perpendicular and proximate to said at least one electrode wherein said at least one electrode is facing away from said ground plane, and at a distance apart to create an electrostatic field which reduces airborne particulates in an enclosed space outside of said system without creating an arc, and
   (c) a dust collection device wherein said device is selected from the group consisting of said ground plane and surfaces of a room-sized enclosed space, a tray containing an aqueous composition, and a metal sheet with spray nozzles.

17. A method for reducing airborne particulates comprising
   (a) installing a space charge system in an enclosed space wherein said system comprises at least one negative air ion generator wherein said generator includes at least one ionizing electrode and a ground plane perpendicular and proximate to said at least one electrode wherein said at least one electrode is facing away from said ground plane, and at a distance apart to create an electrostatic field which reduces airborne particulates without creating an arc,
   (b) applying a high negative voltage to the generator to generate an electrostatic field,
   (c) dispersing negative electrostatic charge throughout said space outside of said system, and
   (d) collecting airborne particulates in or on a dust collection device.

18. The method of claim 17 wherein said dust collection device is at least one tray containing an aqueous composition wherein said at least one tray is located above said generator and ground plane.

19. The method of claim 18 wherein said dust collection device further comprises a second tray located at the bottom of the enclosed space below said generator and ground plane.

20. The method of claim 17 wherein said dust collection device comprises at least on grounded metal plate attached to at least one wall of said enclosed space.

21. The method of claim 20 further comprising spray nozzles mounted as selected from the group consisting of beside the plate, above the plate, and both beside and above the plate.

22. The method of claim 17 wherein the voltage is in the range of about −15,000 volts dc to about −30,000 volts dc.

23. The method of claim 17 wherein said dust collection device is selected from the group consisting of said ground plane and surfaces of a room-sized enclosed space, a tray containing an aqueous composition, and a metal plate with spray nozzles.

24. The method of claim 17 wherein said generator is made up of about 3–12 ionizer bars each containing a plurality of ionizing needle electrodes.

25. A space charge system for reducing airborne contaminants comprising,
   (a) at least one negative air ion generator wherein said generator includes at least one ionizing electrode,
   (b) a ground plane perpendicular and proximate to said at least one electrode wherein said at least one electrode is facing away from said ground plane, and at a distance apart to create an electrostatic field which reduces airborne particulates in an enclosed space outside of said system without creating an arc, and
   (c) a dust collection device wherein said device comprises a first tray containing an aqueous composition located above said generator and ground plane and a second tray containing an aqueous composition located at the bottom of the enclosed space below said generator and ground plane, and
   (d) a source of power to effect said ionization from said electrode.

26. A space charge system for reducing airborne contaminants comprising,
   (a) at least one negative air ion generator wherein said generator includes at least one ionizing electrode,
   (b) a ground plane perpendicular and proximate to said at least one electrode wherein said at least one electrode is facing away from said ground plane, and at a distance apart to create an electrostatic field which reduces airborne particulates in an enclosed space outside of said system without creating an arc, and
   (c) a dust collection device wherein said device comprises at least one grounded metal plate attached to at least one wall of said enclosed space and spray nozzles mounted as selected from the group consisting of beside the plate, above the plate, and both beside and above the plate, and
   (d) a source of power to effect said ionization from said electrode.

* * * * *